United States Patent [19]

Sadel

[11] 4,189,750
[45] Feb. 19, 1980

[54] METHOD AND APPARATUS FOR MEASURING TELEVISION SOUND AND PICTURE

[76] Inventor: Hans Sadel, 274 Riverdale Dr., Fort Lee, N.J. 07024

[21] Appl. No.: 865,609

[22] Filed: Dec. 29, 1977

[51] Int. Cl.² .............................................. H04N 5/50
[52] U.S. Cl. ................................... 358/192; 358/160; 358/188; 325/455
[58] Field of Search ................ 358/192, 93, 160, 193, 358/188; 325/452, 466, 455

[56] References Cited
U.S. PATENT DOCUMENTS 2,910,530  10/1959  Clark ..................................... 358/192

Primary Examiner—Richard Murray
Attorney, Agent, or Firm—Gottlieb, Rackman & Reisman

[57] ABSTRACT

There is disclosed a signal lever meter which provides accurate measurements of both sound and picture signal strengths despite the fact that the same detector and display are used for both. The conventional peak detector has a greater response for television sound signals than it does for television picture signals, and this necessarily leads to errors in the readings for at least one of the signals. In the meter of the invention, when a picture signal is being processed the D.C. bias of the detector is increased, thus increasing its response and allowing accurate measurements to be taken for both signals. In the preferred embodiment of the invention, the detector D.C. bias is automatically increased when a picture signal is being processed in response to the detection of picture signal sync pulses. Additional features of the meter include the provision of both analog and digital displays, and several lights for indicating such things as under-range and over-range conditions and the type of signal being processed.

83 Claims, 18 Drawing Figures

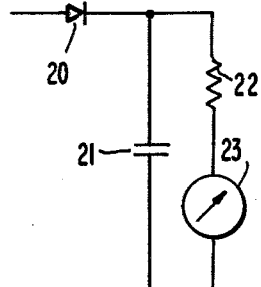
FIG.1
PRIOR ART
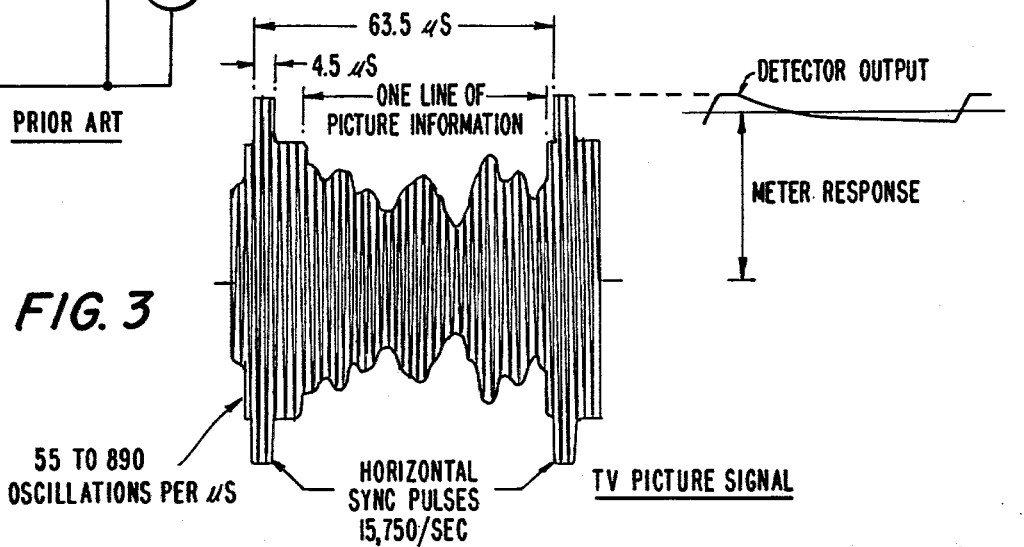
FIG.2
FIG.3
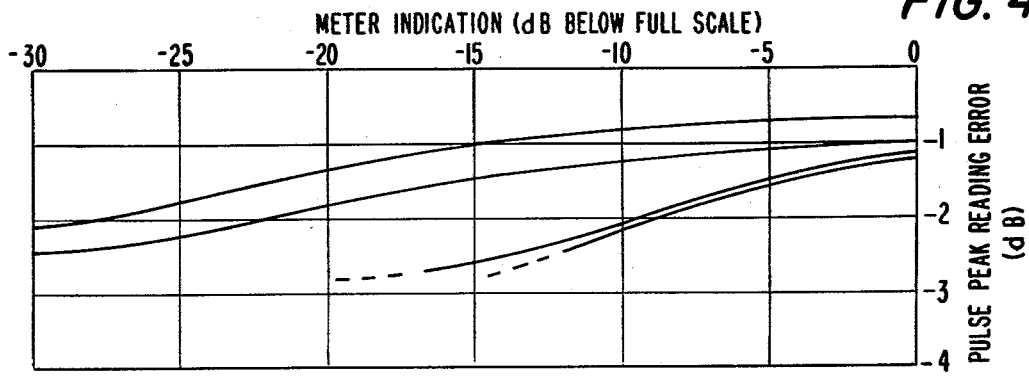
FIG.4
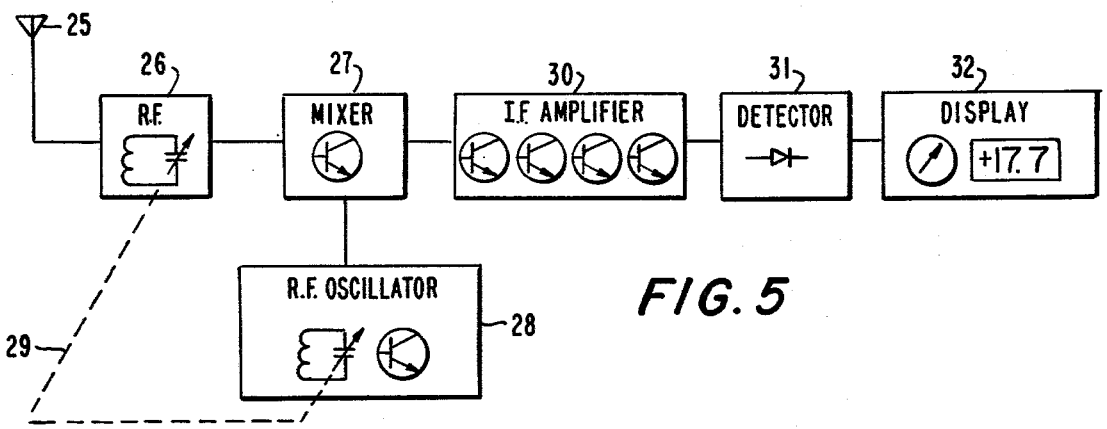
FIG.5

METHOD AND APPARATUS FOR MEASURING TELEVISION SOUND AND PICTURE

This invention relates to an apparatus and method for measuring television sound and picture signals, and more particularly to the use of a single detector and display which provide accurate readings of the strengths of both types of signal.

A conventional television signal consists of sound and picture components. The sound component is a frequency-modulated signal of constant amplitude. The picture component is a combination pulsed and amplitude-modulated signal. In many applications, for example, when installing a cable TV system, it is necessary to determine the individual strengths or amplitudes of the two signal components. For this purpose, a signal level meter (also referred to as a tunable radio frequency voltmeter, a signal strength meter, and a field strength meter) is usually employed. The instrument includes a tunable input section for deriving an intermediate frequency signal (typically, at 42.5 MHz) on which there is modulated the sound signal or the picture signal of a selected channel. The instrument may include a single peak detector for measuring the amplitude of the selected sound or picture signal, and a single display for registering the result.

The basic problem with conventional signal level meters is that the peak detector and display respond differently to sound and picture signals of equal strengths. Measurements of at least one of the two signals are not accurate. Other problems with conventional signal level meters relate to the manner in which they are used. For example, although a calibrated dial may be set so that the sound signal or the picture signal of a particular channel will be processed, there is no way for the technician to be certain that it is indeed the selected type of signal whose strength is being measured. Similarly, it has been found that many technicians consider readings as accurate when in fact an under-range or over-range condition exists, that is, the signal strength is too weak or too strong for an accurate measurement to be made. Most conventional signal level meters employ an analog meter display, and such a display by its very nature does not always provide the desired degree of resolution.

It is a general object of my invention to provide a signal level meter which overcomes the aforesaid problems which are inherent in conventional instruments.

A conventional instrument may employ a peak detector for measuring the peak of the selected sound or picture signal. By suitably calibrating the meter, the actual results may be displayed in the form of RMS values, if that is desired. But the initial stage in the measurement circuit is a peak detector whose function is to generate a voltage which is proportional to the peak of the sound or picture signal being processed. The sound signal is a continuous-wave signal of constant amplitude. The picture signal, on the other hand, has a varying amplitude whose peaks correspond to the sync pulses. If a standard peak detector is calibrated to provide an accurate measurement of a continuous-wave signal, it will not generally provide an accurate measurement of the peaks of a picture signal, for reasons well understood in the art and to be described below. It is for this reason that a conventional signal level meter will usually provide a lower reading for a picture signal than it will for a sound signal of the same strength (peak amplitude), the discrepancy increasing toward the lower end of the meter scale.

I have found that this problem can be overcome simply by changing the bias current through the peak detector in accordance with whether a sound signal or a picture signal is being measured. By increasing the bias current, the response of the peak detector to an A.C. signal increases. Thus by providing for a larger bias current when a picture signal is being processed, it is possible for the same peak detector and display to provide accurate readings for both sound and picture signals over broad ranges of signal strengths.

Preferably, the bias current is changed automatically to insure that the operator will not inadvertently fail to place a sound/picture selector switch in the proper position. In the illustrative embodiment of my invention, the instrument "looks for" horizontal sync pulses in the IF signal. If these pulses are detected, it is an indication that a picture signal is being processed and the system automatically applies the larger of the two bias currents to the peak detector circuit. In the absence of the horizontal sync pulses, the system assumes that a sound signal is being processed and the smaller of the two bias currents is applied to the detector circuit. (In a less expensive embodiment of the invention, a selector switch may be provided instead of the automatic bias control.)

While a digital read-out would appear to be highly desirable for a signal level meter, just as it is for most other instruments, in actual practice there is an important reason why such read-outs have not been incorporated in signal level meters. With the use of a single detector there has just been no way in the prior art to avoid erroneous readings by as much as 2 dB. The same is true with prior art analog meter displays, but the average technician is not as aware of an erroneous analog meter reading as he is of an erroneous digital meter reading. The average technician, when applying a signal of known strength to a signal level meter and when viewing an analog meter error of up to 2 dB, usually assumes that such an error is simply "inherent" in any analog meter instrument. But when the same error appears in a digital display, he thinks that there is something wrong with the instrument (which indeed there is when the same peak detector and display are used for both sound and picture readings). It is partially for this reason that digital read-outs have not been practical for use in signal level meters. It is the elimination of the error in accordance with my invention that overcomes the psychological problem associated with the use of a digital read-out.

In addition to providing a digital display, I also provide the conventional analog display, despite the fact that it might appear that the analog display is not necessary.

When selecting a particular channel for test, and more particularly the sound or picture signal of that channel, a dial is rotated to a particular position. But this initial setting of the dial is only a coarse adjustment. The dial must be further adjusted slightly in order to provide a maximum reading. If the input section of the instrument is not perfectly tuned so that a maximum reading results, the reading is necessarily affected by improper tuning of the instrument and is erroneous. As the dial is fine-tuned, the digital read-out changes; in order to determine that the instrument has been tuned properly, the dial is turned until a maximum reading results. But it is difficult and time-consuming to obtain a peak reading in this manner, especially when the two least significant digits of the digital display may be constantly changing. It is for this reason that I also provide the analog meter display. The calibration dial is turned in a direction which causes the analog meter pointer to increase in deflection. Turning of the dial continues until the pointer deflection just starts to decrease. At this point, it is known that the input section is tuned almost perfectly. The digital display can then be observed. In a three-digit display, the last digit will usually be in error by only one or two units. The dial may be turned slightly in the proper direction to achieve a maximum reading. This is a relatively simple step inasmuch as it usually requires an examination of only a single digit position. Thus the analog meter display in conjunction with the digital meter display allow very rapid fine tuning, a feature which is of considerable practical importance when it is realized that the technician may have to examine the sound and picture signal strengths of numerous channels in succession. Furthermore, the two read-outs are superimposed on each other so that the technician need not transfer his gaze from one read-out to the other, thus further speeding up the fine-tuning process.

To allow the technician to verify that he is measuring a sound signal or a picture signal, I also provide a light indicator which is illuminated whenever a picture signal is being processed. This indicator is also controlled by the detection of horizontal sync pulses.

As a further aid to the operator, the instrument includes an audio amplifier and speaker, the input to which is the demodulated sound or picture signal being measured. When a picture signal is being processed, a buzzing sound is produced from the vertical sync pulses which occur at a 60-Hz rate. When a sound signal is being detected, the sound signal itself is heard. Finally, when the input section is tuned to neither a sound signal nor a picture signal, all that is heard is background noise.

The system is also provided with various light indicators for indicating under-range and over-range conditions, and the sign of the digital reading.

Further objects, features and advantages of the invention will become apparent upon consideration of the following detailed description in conjunction with the drawing, in which:

FIG. 1 depicts a conventional peak-type detector;

FIG. 2 depicts a TV sound signal and the response of a conventional peak detector thereto;

FIG. 3 depicts a TV picture signal and the response of a conventional peak detector thereto;

FIG. 4 is a plot of the picture signal pulse-peak reading errors of typical commercially available signal level meters;

FIG. 5 is a block diagram of the illustrative embodiment of the invention;

Figure 6:
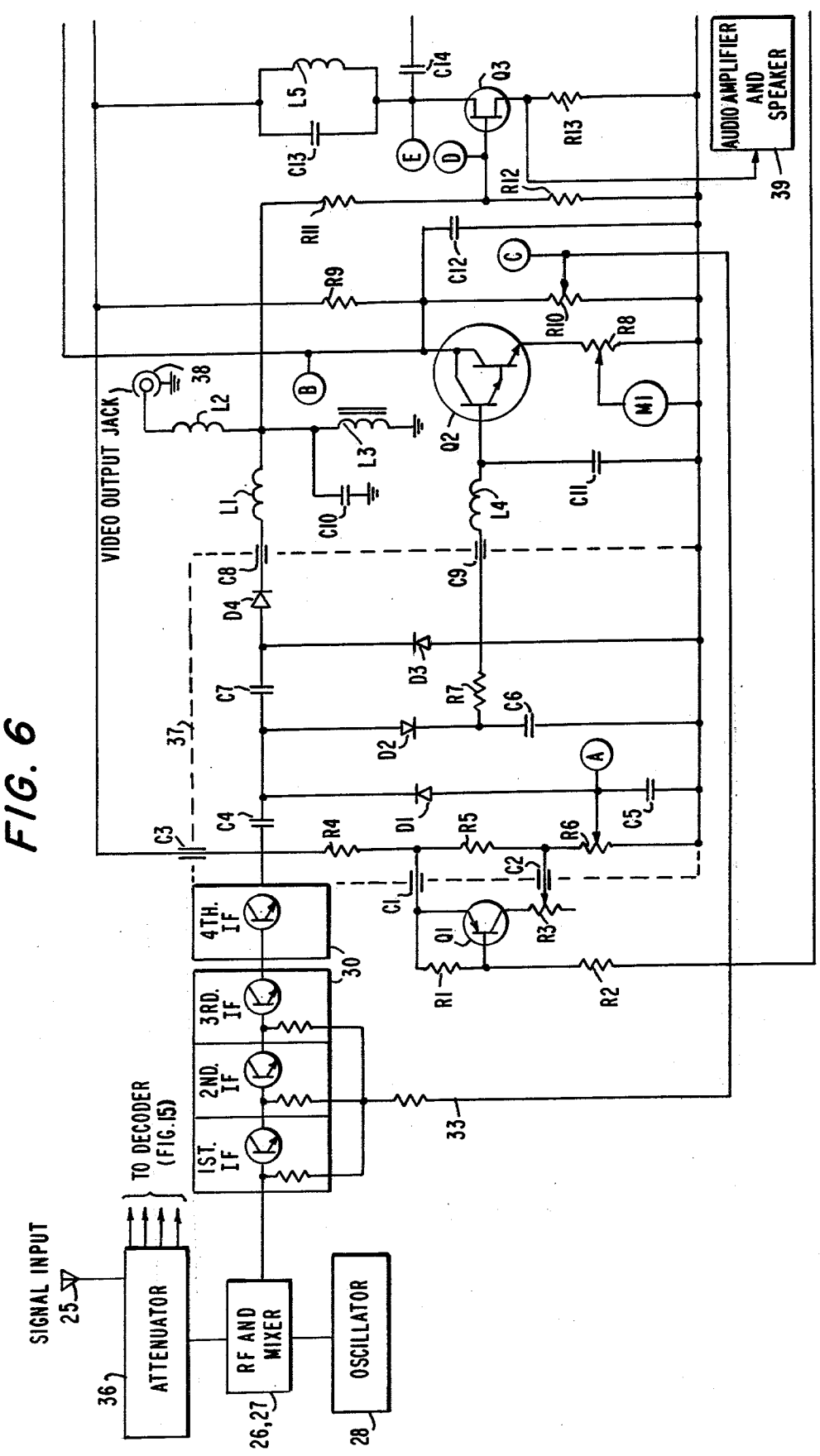
Figure 7:
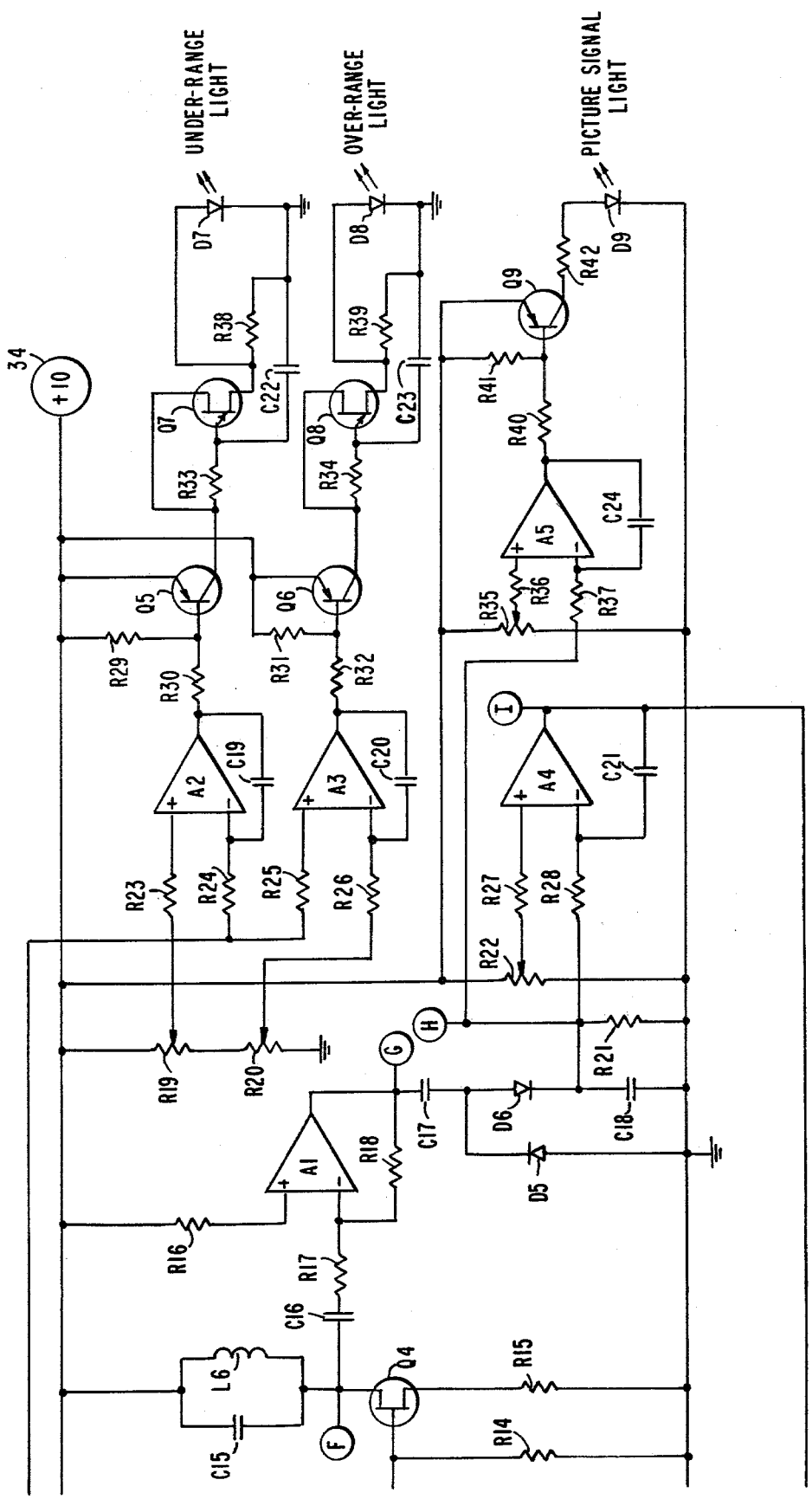
Figure 8:
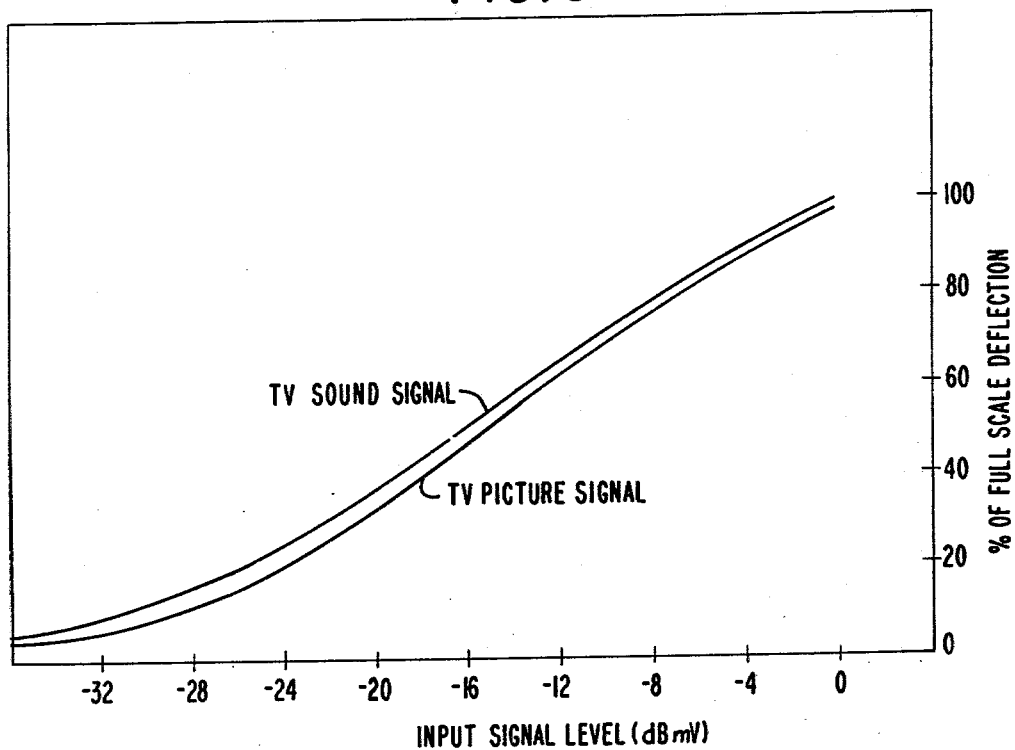
Figure 9:
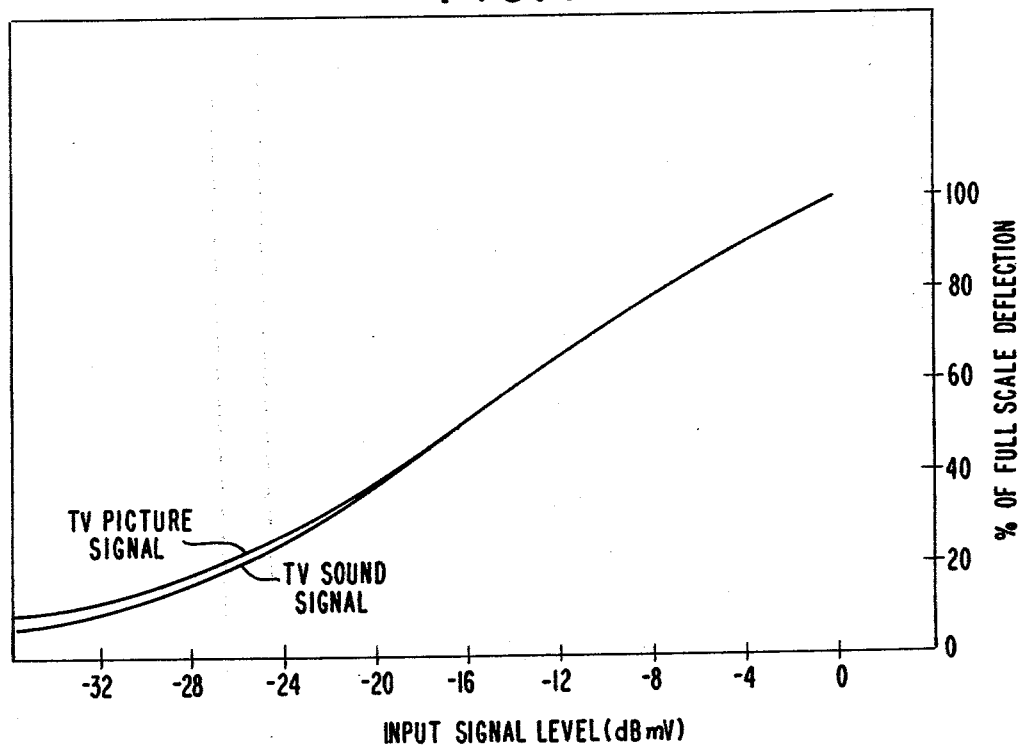
Figure 10:
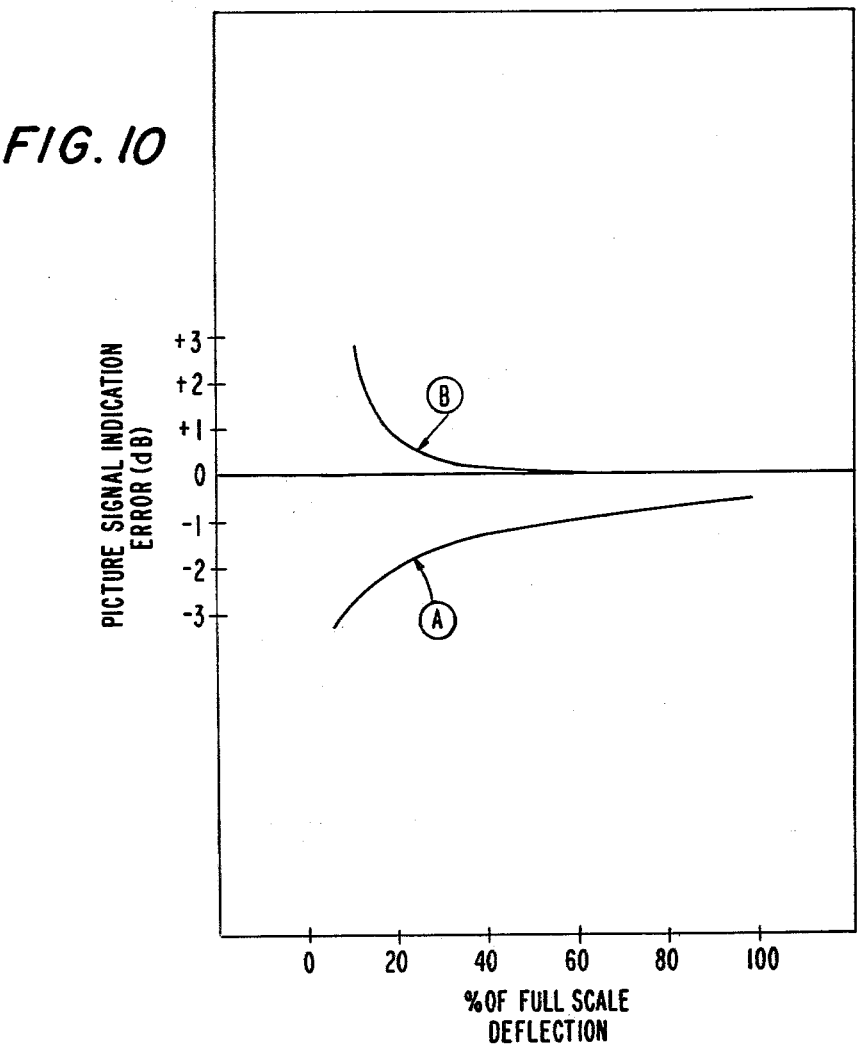
Figure 11:
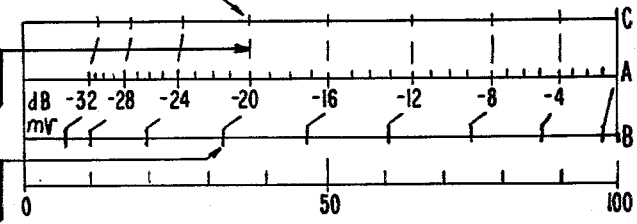
Figure 12:
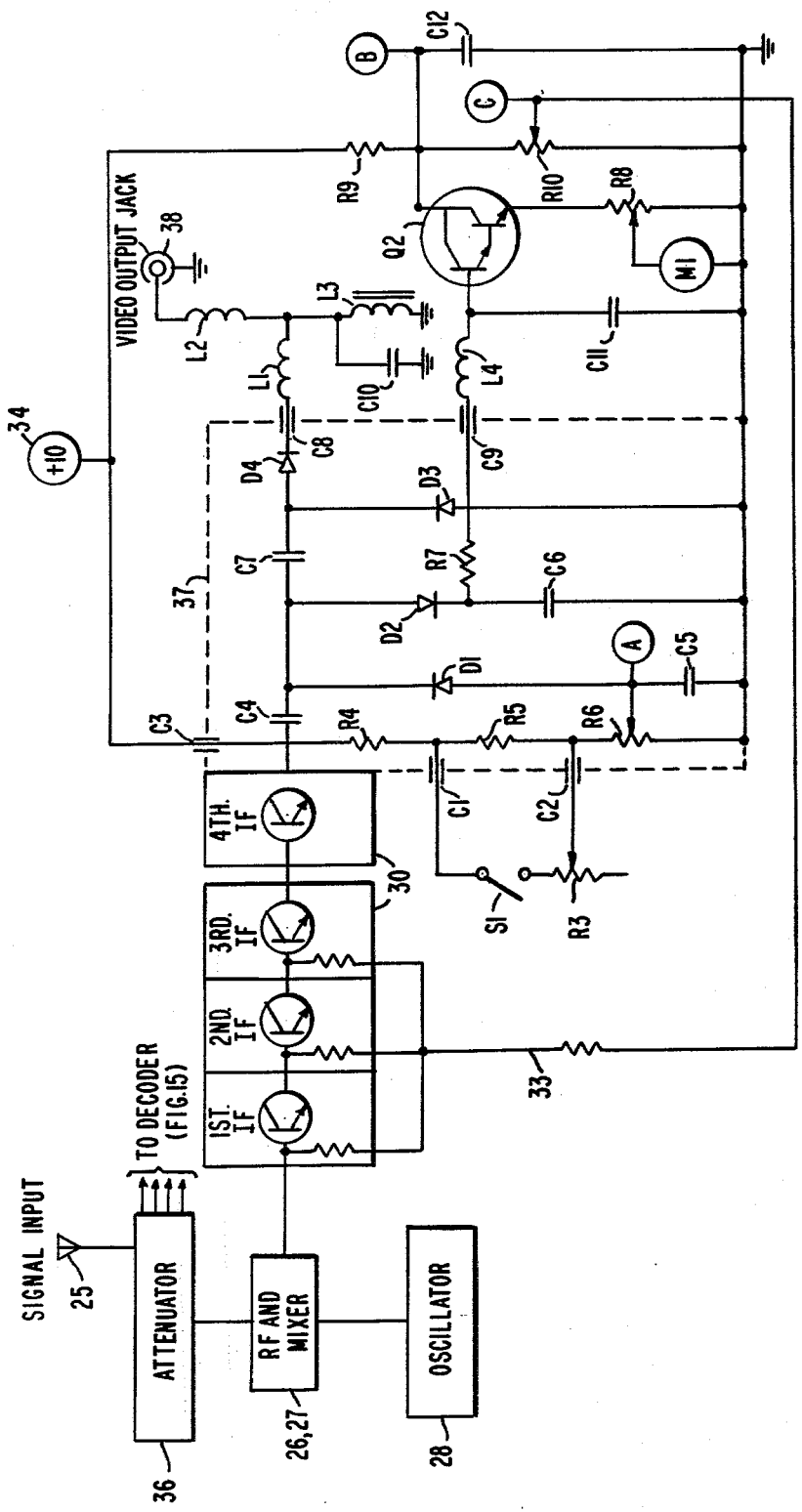
Figure 13:
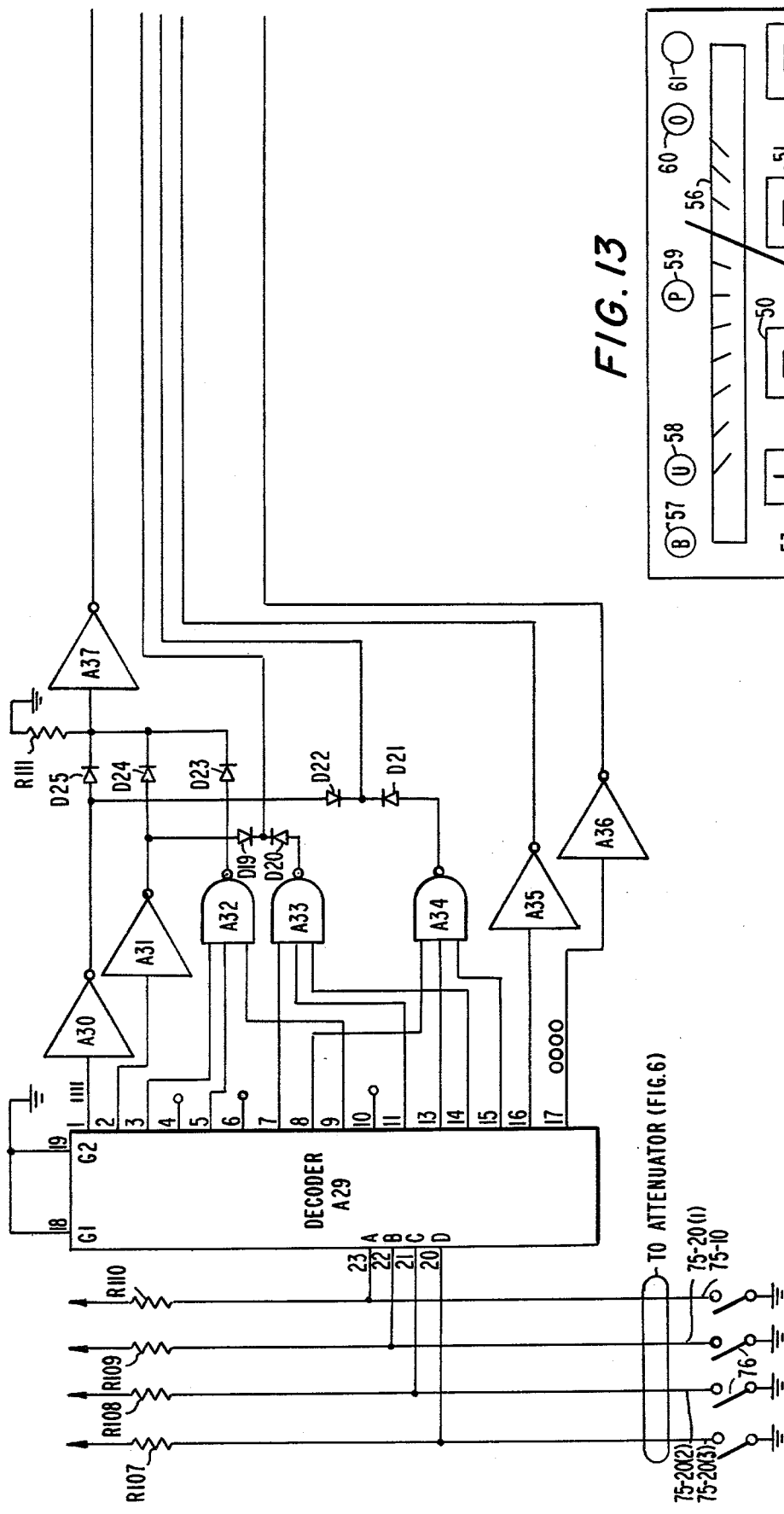
Figure 14:
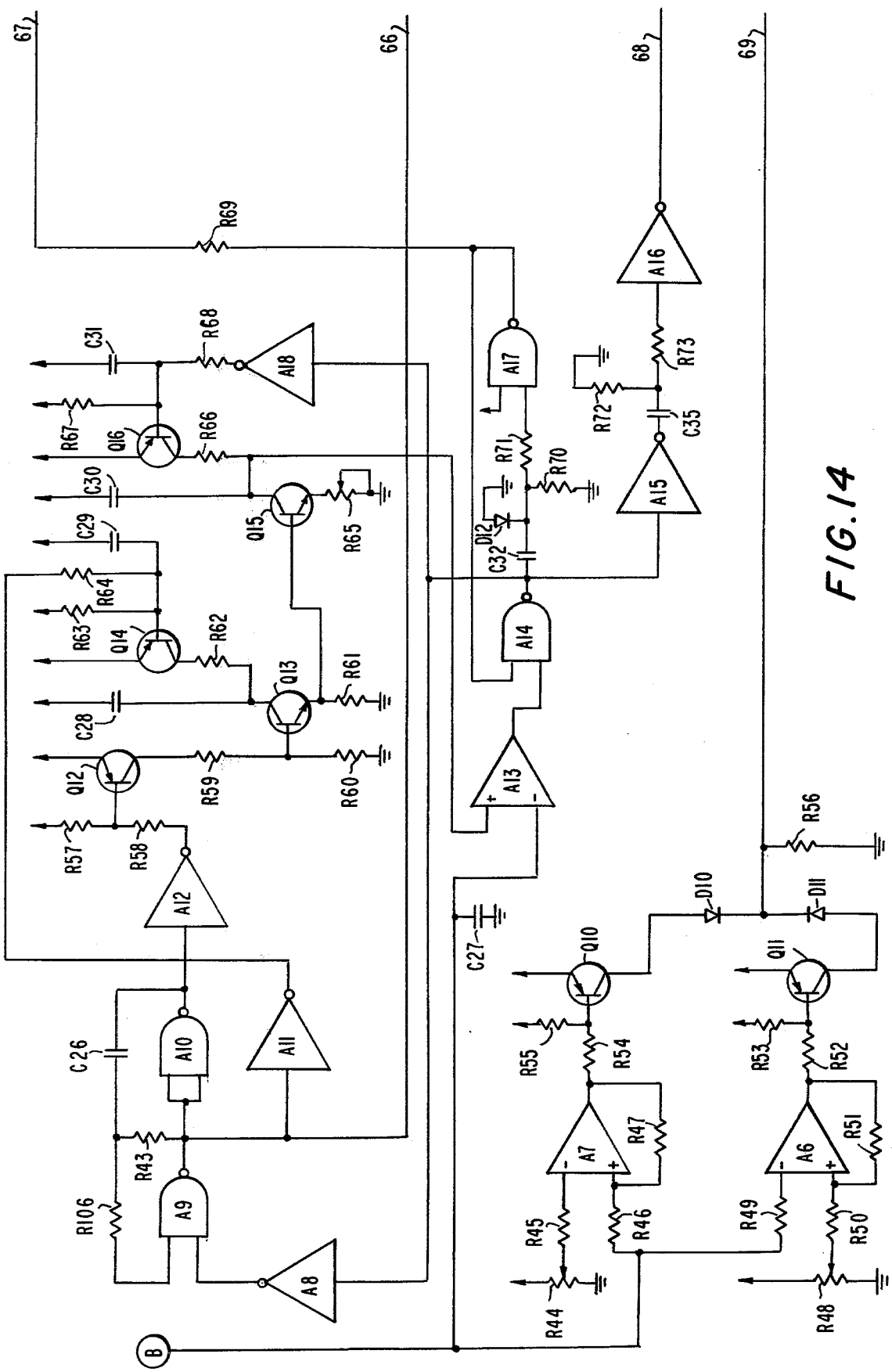
Figures 15, 18:
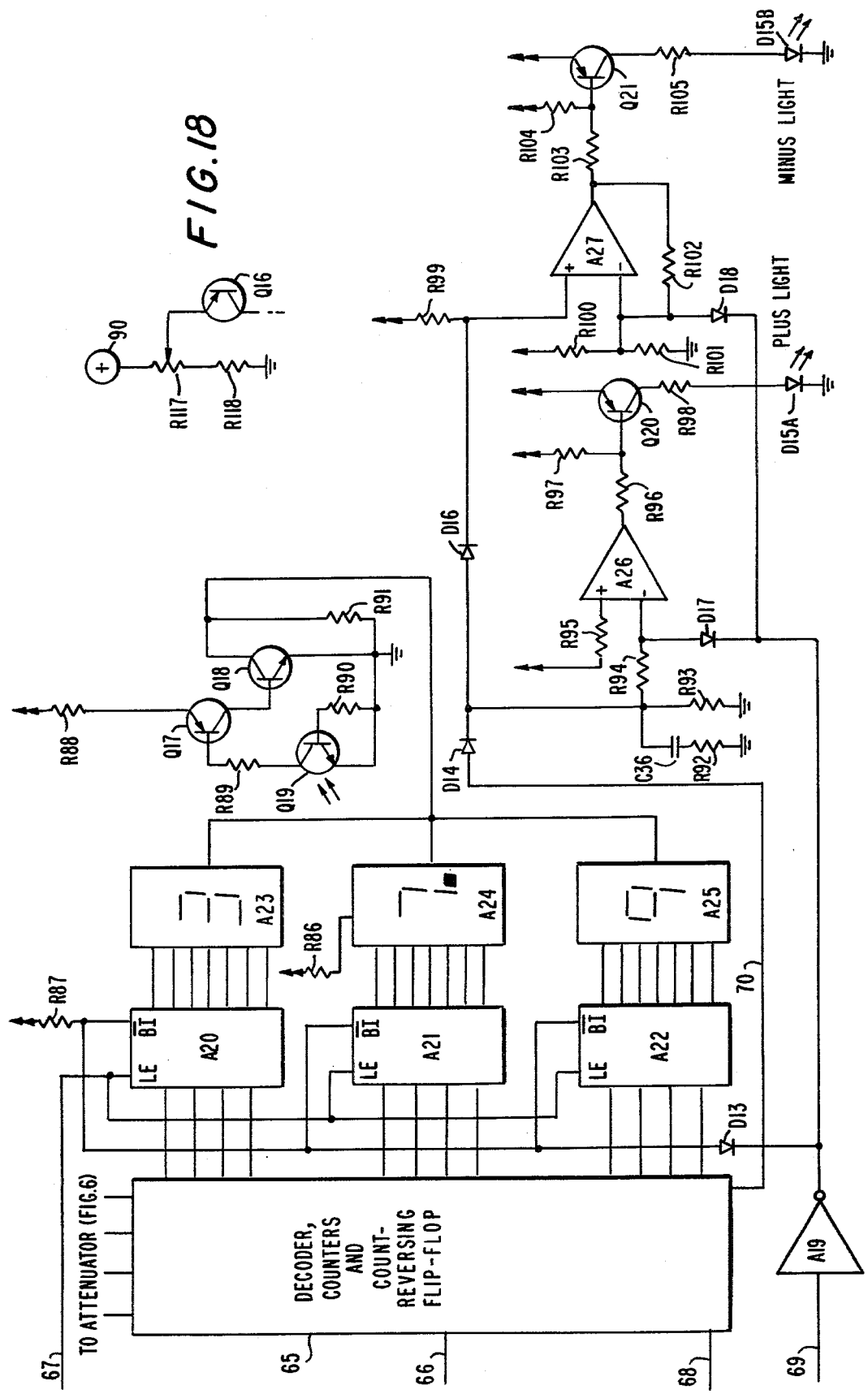
Figure 17:
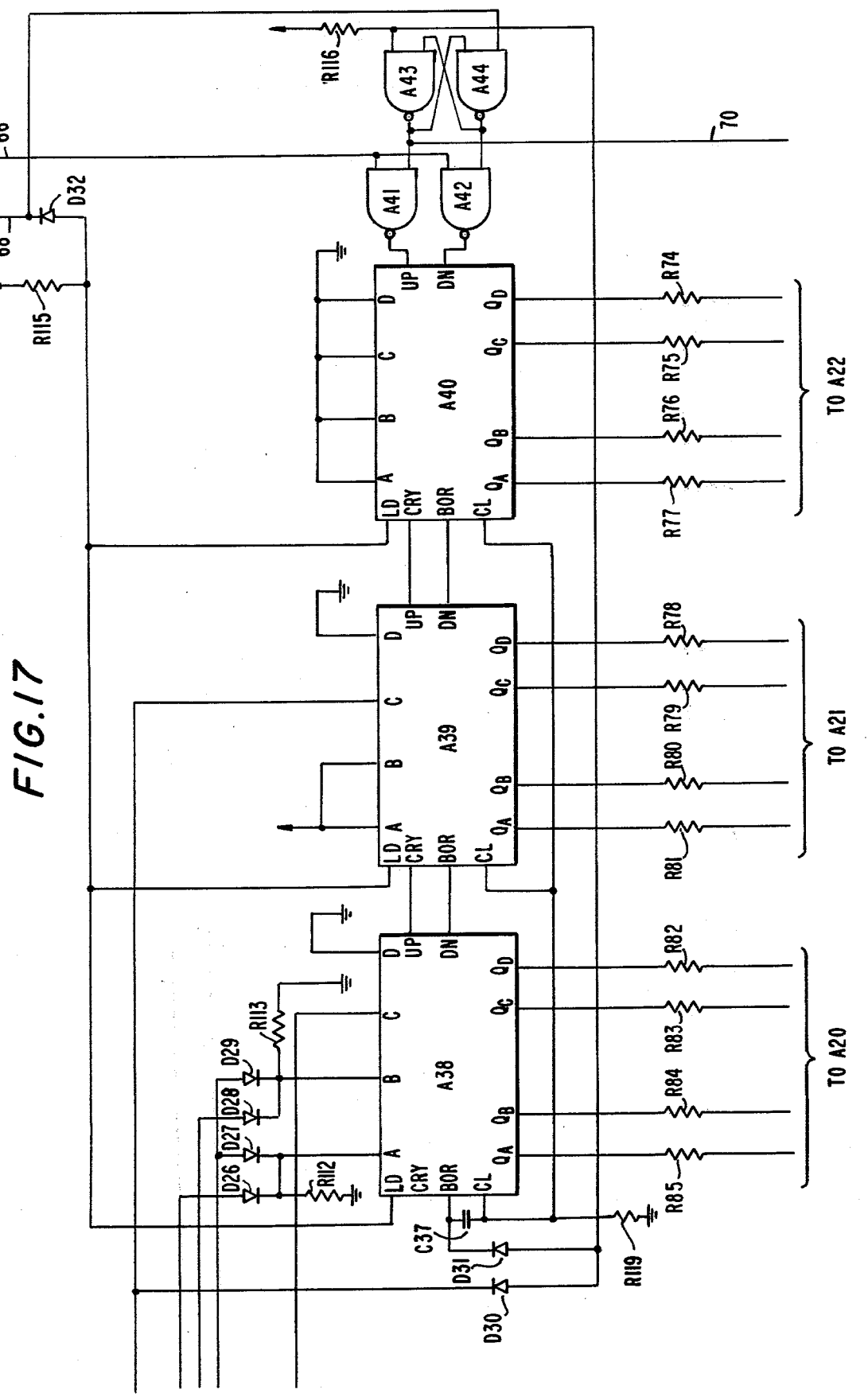

FIGS. 6 and 7, with FIG. 6 being placed to the left of FIG. 7, are a detailed schematic of the illustrative embodiment of the invention, but without showing the circuitry for forming the digital display;

FIG. 8 depicts the response of the instrument of FIGS. 6 and 7 to TV sound and picture signals without the detector-bias-change feature of the invention;

FIG. 9 depicts the respective responses of the instrument to the same two signals with the detector-bias-change feature;

FIG. 10 is a plot based on the TV picture signal curves of FIGS. 8 and 9 and illustrates the improvement which results with the detector-bias-change feature;

FIG. 11 shows the different scales which are obtained for the instrument of FIGS. 6 and 7, with and without the detector-bias-change feature;

FIG. 12 depicts a system similar to that of FIGS. 6 and 7, but one in which the detector bias changes are manually controlled rather than automatic, and in which some additional features of the system of FIGS. 6 and 7 are omitted;

FIG. 13 depicts a preferred form of the display of the overall instrument of the invention;

FIGS. 14 and 15, with FIG. 14 being placed to the left of FIG. 15, depict a circuit, for operating with the circuits of FIGS. 6 and 7, for generating the digital display;

FIGS. 16 and 17, with FIG. 16 being placed to the left of FIG. 17, depict the detailed circuitry in block 65 of FIG. 15; and FIG. 18 depicts the circuit of an "offset" feature which may be added to the circuit of FIG. 14.

Each TV channel is occupied by a picture, or visual information signal, and a separate sound, or audio, information signal. These two signals are widely separated within the TV channel. The TV channel is 6 MHz wide, and the picture and sound carrier frequencies are 4.5 MHz apart. Since it is desired to measure these signals separately, a typical signal strength meter must have a passband which is much narrower than 4.5 MHz so that both signals cannot be received simultaneously. Typical bandwidths fall between 0.1 and 0.7 MHz; in the illustrative embodiment of the invention, a bandwith of 0.5 MHz is used.

The picture signal is a combination pulsed and amplitude-modulated signal. At 63.5 microsecond intervals, a 4.5 microsecond sync pulse initiates the sweep of a horizontal line on the picture tube. During the remaining 59 microseconds, amplitude-modulated picture and other information is transmitted on the picture signal. Also, at intervals of about 1/60 of a second, a series of vertical sync pulses is transmitted to initiate the start of a new picture field. During the horizontal and vertical sync pulses, and only during these pulses, the RF (radio frequency) signal rises to its maximum amplitude. At nearly all other times, and especially during the amplitude modulation of picture intensity information, the RF signal voltage remains below 75% of the maximum amplitude. The percentage of time during which the RF signal voltage rises above 75% and reaches 100% amplitude is 8%.

It is the level of this 100% RF signal amplitude which the TV cable installer technician desires to determine when measuring the strength of a TV picture signal. Since the 100% RF signal voltage amplitude is constant, an ideal tunable radio frequency (TRF) voltmeter will indicate the level of picture signal pulse peaks as a constant reading regardless of the level of the picture intensity signal which appears during the interval between horizontal sync pulses. (For a white line, the picture signal is 15% of maximum RF signal voltage; for a black line, the picture signal is about 70% of maximum RF signal voltage).

The TV sound signal is a frequency-modulated (FM) signal. The amplitude of the signal is constant, and its frequency is varied a very small percentage in accordance with the modulating signal. Since the amplitude is constant, its absolute level is readily determined by means of a conventional semiconductor diode peak-type detector. The detector "sees" only a continuous wave (CW) signal, the modulation having no influence on the detector output.

Nearly all of the TV-TRF voltmeters in use today use the same detector for both the picture and sound signal level measurements. The detectors are of the peak type, and the meters are calibrated for CW signals only.

The basic peak detector, shown in FIG. 1, operates as follows. Diode 20 permits current to flow in only one direction, the current charging capacitor 21. The capacitor charges to a potential equal to that of the positive peak of the input. The capacitor slowly discharges through resistor 22 and meter 23, but each peak of the input CW signal renews the peak charge on the capacitor. The meter deflection is thus proportional to the input peak. The detector has a non-linear input vs. output characteristic for CW signals, due to such things as the diode drop. However, this presents no problem in the measurement of picture sound signals, since the meter scale can be calibrated with a CW signal and will then indicate all CW signal input levels accurately. The scale calibration may not be linear, but this is of little importance. FIG. 2 depicts a typical TV sound signal; the meter response is shown as being a true indication of the peak signal.

FIG. 3 depicts a simplified picture signal with negative polarity modulation envelope, representing one line of a picture, and illustrates the repetitive horizontal sync pulses and the nature of the duty cycle of a negative polarity modulated TV picture signal. In negative polarity modulation, during the transmission of a line of picture intensity, a low signal level represents a bright line and a high signal level represents a dark line.

When such a signal is applied to the detector of FIG. 1, the detector output is sawtoothed because of the discharge of capacitor 21 through resistor 22 and meter 23 between successive horizontal sync pulses, as shown on the right in FIG. 3, and the meter response—proportional to the average value—is less than the response to a sound signal of equal amplitude. This discrepancy is proportionately larger for small signals. The pulse-peak reading errors of some commercially available TV-TRF voltmeters are shown in FIG. 4. Shown at the right end of the graph are full scale errors of from $-0.7$ to $-1.2$ dB; the actual power levels of the RF signal during the picture signal 4.5-microsecond sync pulses range from 17% to 32% higher than the full scale indications of the meters. For smaller signals, the pulse peak reading errors are larger. Thus, when these TRF voltmeters indicate picture signal levels to be 15 dB below full scale, the scale errors are from $-1$ to more than $-2.7$ dB; the actual power levels of the RF signals during the picture signal 4.5-microsecond sync pulses range from 26% to more than 86% higher than the meter indications.

Thus a TRF voltmeter, even if its scale is calibrated for CW signals, produces erroneous readings for TV picture signals. Some of the causes of these errors are:

1. The long interval between relatively short sync (peak) pulses,
2. Curvature of the diode current vs. voltage characteristic in the forward conduction region,
3. Leakage current flow in the reverse conduction region of the current vs. voltage characteristic of the diode,
4. Leakage current in the external load circuits of the detector,
5. Characteristics of the integrating capacitor (21 in FIG. 1), and
6. Deterioration of the pulses before they are even applied to the detector due to the TRF voltmeter input-stage amplifier (not shown in FIG. 1) characteristics, this deterioration arising from
   (a) Amplitude distortion,
   (b) Phase-delay distortion, and
   (c) Insufficient IF amplifier bandwidth resulting in the loss of side band components of the TV picture signal.

FIG. 5 is a block diagram of the illustrative embodiment of the invention, elements 26, 27 and 28 comprising a conventional input stage. The TV signal at antenna (or cable system outlet) 25 is applied (through an attenuator not shown in FIG. 5) to the input of variable RF circuit 26. A marked dial, shown symbolically by dashed line 29, is turned to adjust both the tuned frequency of the RF circuit and the frequency of RF oscillator 28. The dial is marked to represent the sound and picture carriers of all TV channels of interest. The outputs of RF circuit 26 and RF oscillator 28 are operated upon by mixer 27 to generate an IF signal. The IF signal is the same as the input sound or picture signal except that its carrier frequency is always 42.5 MHz no matter which TV channel is being operated upon. The signal is then amplified by IF amplifier 30 which has a bandwidth of about 0.5 MHz, the peak of the sound or picture signal is extracted by detector 31, and the result is depicted on display 32 in both analog and digital forms. As will be described below, although not shown in FIG. 5, the two read-outs are superimposed on each other.

FIGS. 6 and 7 depict the illustrative embodiment of the invention in detail, except for the circuitry associated with the digital display. The signal input 25 is coupled through attenuator 36 to the RF circuit and mixer 26, 27. (The purpose of the attenuator will be described below, as well as its coupling to the digital display circuit; for the moment it is sufficient to understand that the attenuator attenuates the input signal by a selected factor.) Oscillator 28 is coupled to mixer 27, and the mixer output is amplified by the four IF stages 30. The first three stages are provided with automatic gain control, as is known in the art, the AGC control voltage appearing on conductor 33. The elements thus far described are conventional.

The output of the IF amplifier 30 is coupled through capacitor C4 to diodes D1 and D2. These diodes, together with capacitors C4, C5 and C6, comprise a half wave (sometimes called "cascade") voltage doubling peak-type detector. Transistor Q2 is a high input impedance, high current gain amplifier. The amplified detector output from the emitter of transistor Q2, drives meter M1 which thus depicts the signal level being measured in analog form. The amplified detector output, from the collector of transistor Q2, drives an analog-to-digital (A/D) converter as will be described below. The A/D converter output causes the level of the signal being measured to be displayed in digital form.

In the collector circuit of transistor Q2, potentiometer R10 provides forward AGC bias (shown only symbolically) for the first, second and third stages of IF amplifier 30. The IF amplifier output is coupled by capacitor C4 to the diodes D1 and D2, and through capacitor C7 to the diodes D3 and D4. These latter diodes demodulate the IF signal to provide a replica of the modulation envelope (video signal) at the video output jack 38 and at the gate of transistor Q3 (point D) when a TV picture signal is being received, and an audio signal at the gate of transistor Q3 when a TV sound signal is being received.

The elements within shield 37 are those which process high RF-energy signals. To avoid radiation of this energy to the rest of the circuit which might give rise to feedback and erroneous measurements, the shield is employed. Elements C1, C2, C3, C8 and C9 are feed-through capacitors for coupling signals into and out of the shield while at the same time preventing RF leakage.

From the source of transistor Q3, the audio or picture signal is fed to an audio amplifier and speaker 39. If desired, the speaker can be manually turned on or off if a control switch is provided. As described above, the output of the speaker provides an audible indication of the type of signal being processed by the IF stage.

From the drain of transistor Q3, only the 15.75-kHz component which is present almost exclusively in the TV picture signal is further amplified by transistor Q4 and amplifier A1, to be rectified by the voltage doubler comprising diodes D5 and D6, producing a D.C. voltage at point H. This voltage controls two functions. Through comparator A5 and switching transistor Q9, it causes current to flow through light emitting diode (LED) D9, the picture signal indicating light, causing it to glow. The second function of the voltage at point H, via comparator A4 and switching transistor Q1 is to parallel a portion of potentiometer R3 with resistor R5.

The voltage divider network consisting of resistor R4, transistor Q1 and potentiometer R3 in parallel with resistor R5, and potentiometer R6, is powered from the +10 volt regulated source 34, and provides an adjustable forward bias, at point A, of about +1.0 volt for the detector diodes D1 and D2; through these diodes base bias is also applied to the amplifier Q2.

In the no-signal condition, potentiometer R6 is initially adjusted so as to just bring transistor Q2 to the point of conduction, as shown by about 1% deflection on the microammeter M1. Capacitor C5 is the RF bypass capacitor for diode D1, assuring that the maximum amount of the IF signal is applied to the diode. Capacitor C6 is the RF bypass capacitor for diode D2, and also functions as the storage or integrating capacitance of the peak detector.

In the no-signal condition, the current amplifier Q2 is practically cut off. Resistor R9 and potentiometer R10 form a voltage divider, powered from the +10-volt source, and provide no-signal reference potentials at the collector of transistor Q2 (point B) for the A/D converter, and on the tap of potentiometer R10 (point C) for the IF amplifier transistors. The IF amplifier amplification is set in the no-signal condition by adjusting potentiometer R10 for a predetermined voltage at point C.

When a signal is present at the output of the IF stage, the rectified voltage developed by diodes D1 and D2 adds to the +1.0 volt of forward bias from point A. The increased positive voltage applied to the base of transistor Q2 through filter resistor R7, feed-through filter capacitor C9, and filter choke L4 drives the transistor into conduction and causes current to flow from the +10-volt source through resistor R9 into the collector of transistor Q2 and through the microammeter M1. Potentiometer R8 is in effect a variable shunt on M1 and is used to cancel the effects of manufacturing tolerances on mixer conversion, IF amplification, Q2 current amplification, etc. The current flowing through transistor Q2 causes an additional voltage drop in resistor R9, lowering the potential at point B and causing the A/D converter to change the digital display appropriately. Through comparators A2 and A3, switching transistors Q5 and Q6, and pulse generators Q7 and Q8, the changed potential at the collector of transistor Q2 causes the "under-range" and "over-range" lights to flash when appropriate.

The decreased potential at point B results in a decreased current flow through potentiometer R10, which results in a decreased potential at point C (the AGC control voltage), and consequently reduced IF amplification. This negative feedback by means of the AGC circuit, which reduces the IF amplifier gain further and further as the signal input level is increased more and more, results in increasing the level measurement range. The meter covers a larger range than it would if only linear circuits were used (i.e., no AGC, no feedback), making the meter scale nearly logarithmic, as will become apparent below when FIG. 11 is considered.

Measurements of the performance of the system of FIGS. 6 and 7 are graphed in FIGS. 8 and 9.

The instrument was adjusted so that a 1.0 mv rms, CW input signal resulted in full scale deflection of microammeter M1 when a 10-dB pad was inserted in the input signal path by attenuator 36. This input signal level, 0 dBmv (0 dB with respect to 1.0 millivolt), was designated the reference level, and placed at the right end of both graphs. All subsequent lower input levels were plotted horizontally to the left on the abscissa as dB below dBmv. Vertically, the microammeter reading obtained is plotted as percent of full scale. The TV SOUND SIGNAL curve thus accurately relates microammeter readings to input signal levels.

The TV PICTURE SIGNAL curve in FIG. 8 was obtained with transistor Q1 out of the circuit, i.e., without the detector bias adjustment feature of the invention. With the levels of a test TV picture signal during the 4.5 microsecond horizontal sync pulses adjusted to the same levels used to obtain the TV SOUND SIGNAL curve, the TV PICTURE SIGNAL curve was obtained. Every point on the TV PICTURE SIGNAL curve falls below the TV SOUND SIGNAL curve by a significant amount. As in conventional signal level meters, the response of the instrument is greater for CW (sound) signals than it is for picture signals.

The picture signal indication error (in dB) is the horizontal distance between the two curves of FIG. 8. For example, with a picture signal level such that the 4.5 microsecond RF pulse level is −16 dBmv, the microammeter indicated 47.0% deflection. Since conventionally the microammeter scale is calibrated for CW signals, at 47.0% deflection the input signal level would be −17.2 dBmv on the TV SOUND SIGNAL curve. This reading is 1.2 dB too low for the −16 dBmv picture signal level. The picture signal indication error is thus −1.2 dB.

In FIG. 10, the lower curve labeled A, which is derived from FIG. 8, is a plot of picture signal indication error vs. % of full scale deflection for the meter of FIGS. 6 and 7 with transistor Q1 omitted. The plot is roughly representative of many instruments commercially marketed (see FIG. 4).

The system of FIGS. 6 and 7 incorporates a circuit adjustment, which can be applied either automatically (as shown in the drawing) or manually (as will be described), to greatly reduce the picture signal indication error over nearly the entire microammeter scale and over the digital display readable range. It has been found that a small appropriate increase in the detector diode (D1 and D2) forward bias when TV picture signals are being detected will correct the microammeter reading across its scale and the digital readout across its readable range, except for very small input levels. FIG. 9 is a plot comparable to that of FIG. 8 but with transistor Q1 in the circuit to increase the detector bias when picture signals are being processed. The improvement is apparent. The curve in FIG. 10 labeled B, which is derived from the data plot of FIG. 9, shows the great reduction in picture signal indication error which is achieved by the system of the invention. By increasing the bias current through the diodes D1 and D2, they are operated further up on their current/voltage characteristic which characteristic increases in slope as a function of voltage. This, in turn, means that the response to an A.C. input signal increases. Thus the detector output or response is increased for picture signals to compensate for its inherent difficulty in detecting such signals correctly.

The IF amplifier output is applied through coupling capacitor C7 to the voltage doubling peak detector comprising diodes D3 and D4. The function of this detector is to demodulate the TV picture signal to the extent of providing the video signal at the VIDEO OUTPUT JACK 38 and at point D, the gate of transistor Q3. When a TV sound signal is being received, the detector provides the audio signal at point D. Capacitor C8 is both the RF bypass for diode D4 and the storage capacitor for the detector as well as being a feedthrough capacitor for passing the signal through the wall of the detector compartment 37. Inductor L1 is a filter choke, passing the video and audio signals, but presenting a very high impedance to any IF signal present. Inductor L2 is a filter choke, passing the video and audio signals to the VIDEO OUTPUT JACK and further attenuating any IF signal which gets through inductor L1. Inductor L2 also prevents external RF signals from entering the TRF voltmeter cabinet through the video jack. Capacitor C10 furnishes a low impedance path to ground for any IF signal present and, in conjunction with inductors L1 and L2, filters it out. Iron-core inductor L3 furnishes a low resistance discharge path to ground for capacitors C8 and C10. Resistor R11 is a filter resistor but presents a relatively low impedance path for the video and audio signals coupled to the gate of transistor Q3. Resistor R12 furnishes a D.C. path to ground for the gate of transistor Q3.

Transistors Q3 and Q4, and amplifier A1 work together as a 15.75-kHz tuned amplifier. Transistor Q3 functions as a high input impedance amplifier. Resistor R13 is the source resistor for transistor Q3 and limits the drain-to-source current by developing gate-to-source bias for the transistor. The source is connected to audio amplifier and speaker 39 to provide the audible signal as described above.

Capacitor C13 and inductor L5, tuned to 15.75 kHz, are the drain load for transistor Q3 and present the greatest impedance to the 15.75-kHz component of the drain-to-source signal current, thus realizing, at point E, the greatest amplification for the 15.75-kHz component of the signal at point D.

Transistor Q4 is a high input impedance amplifier. Capacitor C14 couples the 15.75-kHz signal at point E to the gate of transistor Q4 while blocking the drain potential of transistor Q3. Resistor R14 is the gate return to ground for transistor Q4 and keeps the gate at ground potential during no-signal conditions. Resistor R15 is the source resistor for transistor Q4 and limits the drain-to-source current by developing gate-to-source bias for the trasistor.

Capacitor C15 and inductor L6, tuned to 15.75 kHz, are the drain load for transistor Q4 and present the greatest impedance to the 15.75-kHz component of the drain-to-source signal current, thus realizing, at point F, the greatest amplification for the 15.75-kHz component of the signal at point E.

Amplifier A1 is a high amplification operational amplifier. Capacitor C16 couples the 15.75-kHz signal present at point F to the inverting input of the amplifier while blocking the D.C. potential at point F. Resistor R16 is the bias resistor for the non-inverting input of amplifier A1. Resistors R17 and R18 are the amplification-determining resistors for the amplifier.

When a TV sound signal, or any CW type signal, is presented to the TRF voltmeter input, there is no output from amplifier A1. When a TV picture signal is presented to the TRF voltmeter input, the tuned amplifier (Q3, Q4 and A1) develops approximately 3 volts (A.C.) at 15.75-kHz at the output of amplifier A1, point G, for the weakest TV picture signal measurable, and approximately 3½ volts for a full-scale signal.

Diodes D5 and D6 comprise a voltage doubling peak detector. Capacitor C17 couples the 15.75-kHz signal output of amplifier A1 to the diodes D5 and D6, while blocking the passage of direct current. Capacitor C18 is the RF bypass capacitor for diode D6, insuring that the maximum amount of the output signal at point G is developed across diode D6. Capacitor C18 is also the storage capacitor for the detector. The detector output, across resistor R21 at point H, is approximately 8 volts (D.C.) for the weakest TV picture signal which is measurable and approximately 9 volts for a full scale signal.

Although the horizontal sync pulses (15.75 kHz) are used to derive an indication at point H of the presence of a picture signal, it will be apparent that amplifiers Q3, Q4 and A1 could be tuned to the vertical sync pulses for the same purpose, although tuning to the horizontal sync pulses is preferred.

Amplifier A5 functions as a comparator. Resistor R35 is a potentiometer, operating from +10 volts to ground, and it provides an adjustable positive reference voltage to the non-inverting input of amplifier A5. Resistors R36 and R37 are input current limiting resistors. Capacitor C24 is a high-frequency feedback capacitor around comparator A5 for transient suppression and noise reduction.

Resistor R40 is the base current limiting resistor for switching transistor Q9. Resistor R41 is the base biasing resistor. Resistor R42 is the Q9 collector current limiting resistor to the PICTURE SIGNAL LIGHT, LED D9.

When the potential at point H (in the presence of a TV picture signal) becomes more positive than the reference voltage set at the tap of potentiometer R35, the output of comparator A5 changes from nearly +10 volts to a very low voltage, and switching transistor Q9 changes from off to on. Collector current now flows through diode D9 and causes it to light, indicating that a TV picture signal is being received.

Amplifier A4 also functions as a comparator. Resistor R22 is a potentiometer by which an adjustable positive reference voltage is presented to the comparator non-inverting input. Resistors R27 and R28 are input current limiting resistors. Capacitor C21 is a high frequency feedback capacitor for transient suppression and noise reduction. When the output voltage of the detector at point H, which is coupled to the inverting input of the comparator, is lower than the reference voltage set on the tap of potentiometer R22, the low impedance output of the comparator, at point I, is high at approximately +9 volts. When a picture signal is being measured, the output voltage of the detector at point H rises above the reference voltage set on the tap of potentiometer R22, and the comparator output voltage at point I becomes very low, less than ½ volt.

Transistor Q1 is the signal detector bias switch. Resistors R1 and R2 are voltage dividing bias resistors for the base of the transistor. Resistor R3 is the signal detector increased forward bias adjustment for the reception of TV picture signals. When a TV sound signal, or CW type signal is being received, there is no signal output from the 15.75-kHz tuned amplifier at point G. The potential at point H is below the comparator reference input, and the comparator output at point I is high. This effectively keeps transistor Q1 turned off. Therefore, for CW type signals, only resistors R4, R5 and R6 determine the signal detector forward bias.

When a TV picture signal is being received, the detector diodes D3 and D4 demodulate the signal from the IF amplifier; the tuned amplifier (Q3, Q4 and A1) amplifies the 15.75-kHz component; the detector diodes D5 and D6 rectify the 15.75-kHz signal; the comparator A4 output goes low; Q1 is turned on and potentiometer R3 is effectively placed across resistor R5. The setting of potentiometer R3 is such that the detector forward bias at point A is increased sufficiently to minimize the picture signal reading error.

FIG. 11 shows the different analog meter scales which are obtained for accurate calibration of the instrument. Scale A is the calibration obtained for a TV sound (CW type) signal; the detector diodes were forward biased and AGC was used to obtain the nearly linear logarithmic scale. The scale is logarithmic because each division is ten times the logarithm of the power ratio over a division such that ten divisions represent a power change by a factor of ten. Also, each division is twenty times the logarithm of the voltage ratio over a division. Thus the unit of measurement is the deciBel. Scale A is obtained from the data plot of the TV SOUND SIGNAL curve of FIGS. 8 and 9.

Scale B is the calibration scale obtained for a TV picture signal with no change in the detector bias current, i.e., with transistor Q1 omitted. This scale is obtained from the data plot of the TV PICTURE SIGNAL curve of FIG. 8. However, commercial TRF voltmeters do not usually provide such a scale, and TV picture signal levels are conventionally read off scale A which is accurate for only CW type signals. This results in errors. For a 0 dBmv picture signal the error is −0.7 dB, and for a −20 dBmv picture signal the error is −1.5 dB.

Scale C is the calibration scale obtained for a TV picture signal, with the detector forward bias at point A in FIG. 6 increased so as to reduce the error at full scale to zero. This scale is obtained from the data plot of the TV PICTURE SIGNAL curve of FIG. 9. For a 0 dBmv picture signal the error is zero; and for a −20 dBmv picture signal the error is only +0.2 dB.

FIG. 11 also shows equivalent digital readings which are obtained for 0 dBmv (1.0 mv) and for −20 dBmv (0.1 mv) input signal levels. At the ends of scale A are shown the equivalent digital readings for TV sound (CW type) signals. Since the instrument is adjusted and calibrated for this type of signal, the error is very small, in fact, not resolvable (less than 0.1 dB). In the two respective cases, the digital displays are 00.0 and −20.0.

At the ends of scale B are shown the equivalent digital readings obtained with TV picture input signals of the same 0 dBmv and −20 dBmv levels, and with no change in the detector bias in the measuring circuit. The errors are −0.7 dB and −1.5 dB inasmuch as the digital display shows −00.7 when it should show 00.0, and shows −21.5 when it should show −20.0.

At the ends of scale C are shown the equivalent digital readings obtained with the same TV picture input signals as used for the readings shown at the ends of scale B, but with increased detector forward bias at point A in FIG. 6. Since the detector forward bias increase is adjusted by potentiometer R3 of FIG. 6 so as to result in no error for the 0 dBmv TV picture signal, the digital reading at the right end of scale C shows no error. For the −20 dBmv TV picture input signal level, the −19.8 digital reading shown at the left end of scale C is in error by only +0.2 db rather than −1.5 dB.

The potential at the collector of transistor Q2, point B, which is determined by the level of the IF output signal applied to the detector D1 and D2, in addition to being used to operate the A/D converter for the digital display as will be described below, is also used to operate the UNDER-RANGE and OVER-RANGE warning lights. These lights warn the operator that with the present input attenuator (element 36 on FIG. 6) setting, the input signal level is not within the accurate measurement range of the instrument.

Potentiometers R19 and R20 operate from the +10-volt supply to ground, and are used to derive the reference voltages for the under-range and over-range light circuits. Since the potential at point B decreases with increasing signal, the under-range reference voltage potentiometer R19 is at a higher positive potential than is the over-range reference voltage potentiometer R20.

Resistors R23 and R24 are input current limiting resistors for comparator A2. Capacitor C19 is a feedback capacitor for transient suppression and noise reduction. In the no-signal condition, the reference voltage potentiometer R19 is set so that the potential at point B, presented to inverting input of the comparator is more positive than the potential set on the tap of potentiometer R19 connected to the non-inverting input of the comparator. The low-impedance output potential of the comparator will be very low, less than ½ volt.

Resistor R29 is the base biasing resistor for switching transistor Q5 and resistor R30 is its base current limiting resistor. With the comparator output low, transistor Q5 is turned on and current can flow in its collector circuit to transistor Q7.

Unijunction transistor Q7 functions as a pulse generator. Resistor R33 is the charging resistor for capacitor C22, and so controls the time required for the capacitor to charge to the emitter-to-base-one firing potential of transistor Q7, thus determining the pulse repetition rate. Resistor R38 is the base-one current limiting resistor, and so controls the discharge time of capacitor C22, thus determining the pulse width. With transistor Q5 turned on, transistor Q7 pulses. Diode D7 is the UNDER-RANGE LIGHT light-emitting diode and glows for approximately one-third second once each second when transistor Q7 pulses to warn the operator that the input signal is below the range of accurate measurement.

When the IF output signal level rises enough to come within the range of accurate measurement, the potential at point B, applied to the inverting input of comparator A2, falls below the reference potential at the non-inverting input. The inverter output goes high, transistor Q5 is turned off, and transistor Q7 stops pulsing, causing diode D7 to remain off.

In the over-range circuit, resistors R25 and R26 are input current limiting resistors for compartor A3, and capacitor C20 is a feedback capacitor for transient suppression and noise reduction. The reference voltage potentiometer R20 is set just below the high end of the accurate measurement range so that the potential at point B, applied to the non-inverting input of comparator A3, is more positive than the potential set on the inverting input. The low impedance output potential of comparator A3 is high, approximately +9 volts. Resistor R31 is the base biasing resistor for switching transistor Q6 and resistor R32 is its base current limiting resistor. With the compartor output high, transistor Q6 is held off and current does not flow in its collector circuit to transistor Q8.

Unijunction transistor Q8 is also arranged to generate pulses. Resistor R34 is the charging resistor for capacitor C23, and so controls the time required for capacitor C23 to charge to the emitter-to-base-one firing potential of transistor Q8, thus determining the pulse repetition rate. Resistor R39 is the base-one current limiting resistor and so controls the discharge time of capacitor C23, thus determining the pulse width. With transistor Q6 turned off, transistor Q8 remains off. Light-emitting diode D8 is the OVER-RANGE LIGHT and will remain dark when transistor Q8 does not pulse.

When the IF output signal level rises high enough to be above the range of accurate measurement, the potential at the non-inverting input of comparator A3 falls below the reference potential at the inverting input. The comparator output goes low, transistor Q6 turns on, and transistor Q8 starts pulsing, causing diode D8 to glow repetitively approximately once each second for about one-third second, thereby warning the operator that the input signal is above the range of accurate measurement and that another attenuator pads should be inserted in the path of the input signal.

Instead of using the electronic circuitry to automatically switch to increased detector forward bias for TV picture signal measurement, a manually operated switch may be used in place of the electronic switch Q1. The circuit of FIG. 12, which omits the automatic bias change feature as well as the UNDER-RANGE, OVER-RANGE and PICTURE SIGNAL light features and the amplifier/speaker 39 feature will be described before proceeding to the circuits which actually derive the digital display.

From the circuit of FIG. 6, resistors R1 and R2 and transistor Q1 are removed, and switch S1 is connected in place of transistor Q1 between capacitor C1 and potentiometer R3 as shown in FIG. 12. Resistor R11 and all of the electronic components following it are also removed as shown in FIG. 12. All other components remaining in FIG. 12 are identical to the same numbered components in FIG. 6.

With switch S1 in FIG. 12 in the open position, the TRF voltmeter is first adjusted and calibrated to read correctly for TV sound signals. In calibrating the instrument, potentiometer R10 is set for the predetermined AGC voltage at point C. With no input signal, potentiometer R6 is adjusted so that the potential at point A forward biases the detector diodes D1 and D2 and just brings transistor Q2 to the beginning of conduction as shown by 1% of full scale deflection on the microammeter M1. Potentiometer R8 will have been adjusted so that a 1.0-mv CW input signal produces full scale deflection (with a 10-dB pad being inserted in the input signal path).

With switch S1 in the closed position, and the input signal changed to a TV picture signal having its RF signal level during the 4.5 microsecond horizontal sync pulses equal to 1.0 mv, potentiometer R3 is adjusted to bring the microammeter deflection back up to full scale. With this adjustment the picture signal indication error will be as shown in the curve labelled B in FIG. 10.

To measure TV sound and picture signal levels, the switch S1 must be manually switched between its two respective positions.

FIG. 13 depicts a preferred form of the display of the overall instrument of the invention. Pointer 55 is the pointer of microammeter M1 of FIG. 6. The scale 56 included on the display has no numerical markings thereon, although it does contain 11 graduation marks in 2 dB steps. As described above, the analog display is used primarily for tuning purposes. The actual measurement values are determined from the digital display. The digital display itself includes three windows, 50, 51 and 52 beneath which are respective 7-segment digit displays. The decimal point of the second display is always lighted, and thus the digital display always provides a resolution measured in tenths of a dB. Two additional windows 53 and 54 are provided, each window being marked with a plus or a minus sign. A respective light-emitting diode under one of these windows causes the respective sign to be lighted. In the case of FIG. 13, the plus sign is shown turned on; the minus sign within window 54 is shown in dashed form only to indicate that the minus sign can be displayed when the measurement is negative.

At the top of the display there are five windows 57-61. The first four windows are marked with the respective letters B, U, P and O. When a picture signal is being detected and diode D9 (FIG. 7) is energized, the PICTURE SIGNAL LIGHT 59 is lighted. Similarly, when one of diodes D7 or D8 (FIG. 7) is repetitively turned on and off, one of the UNDER-RANGE or OVER-RANGE LIGHTS 58 or 60 flashes. The flashing of either light informs the operator that the measurement displayed on the digital read-out is inaccurate.

The circuit of FIGS. 6 and 7 includes a ten-volt regulated source 34. The circuit of FIGS. 14 and 15 is operated from both this source and a six-volt battery; certain of the chips used in the digital-display generating circuit require a six-volt source, and since this source need not be regulated a battery is utilized for the purpose. The system may be provided with a circuit for signalling when the battery voltage falls below a safe level, in which case a battery warning light 57 (FIG. 13) flashes. The circuit for detecting such a condition is not shown in the drawing inasmuch as such circuits are standard in the art and such a feature does not form a part of the present invention. However, the preferred position for a battery-warning light is shown in FIG. 13 in the event such a circuit is included in the instrument.

Window 61 is different from the other windows in that it does not contain beneath it a light source. On the contrary, underneath this window there is a photo-transistor (Q19 in FIG. 15) which is responsive to the ambient light level as will be described below. The purpose of the photo-transistor is to control the intensity of the digital display. As the ambient light level increases, a higher current is drawn by the three digital display elements to increase the brightness of the display.

The instrument itself is calibrated to provide accurate measurements of input signal levels in the range −20 to 0 dBmv when a 10-db pad is inserted in the input signal path by attenuator 36, with 0 dBmv corresponding to an input signal of 1.0 mv. (It should be noted that the system is calibrated for rms signals even though the basic detecting circuit is a peak detector; that is of no moment, however, since the calibration takes into account the conversion factor between rms and peak values.) The attenuator itself includes four pads—one 10-db pad and three 20-db pads. A separate switch is provided for inserting each pad, and whichever pads are inserted are all connected in series. Thus the total attenuation may vary between 0 and 70 db. Since the calibration is performed with a 10-db pad inserted in the input signal path, a 1.0-mv input signal with no attenuator pad inserted will actually result in an OVER-RANGE condition. The smallest signal which can be measured accurately is −30.0 dBmv (no attenuator pads inserted) and the lowest measurement range is thus −30.0 to −10.0 dBmv. The highest measurement range, with a maximum attenuation of 70 db, is +40.0 to +60.0 dBmv. The instrument can thus accurately measure input signals ranging from −30.0 to +60.0 dBmv. Depending upon which attenuator pads are inserted in the input circuit, an appropriate adjustment is made in the digital display. Even though the measurement circuit can only operate accurately on signals at point B in FIG. 6 which represent signal levels in the range −30.0 to −10.0 dBmv, whenever the input signal is attenuated such that the potential at point B falls within the accurate measurement range, an appropriate increase is made in the digital display value. For example, if the input signal is attenuated by 30 db in the attenuator and the potential at point B corresponds to a signal level of −20.0 dBmv, the actual display will be −20.0 +30.0 or +10.0 dBmv.

Whichever range is selected for the measurement, the measuring circuit of FIGS. 14 and 15 is accurate only for potential changes at point B in FIG. 6 which correspond to unattenuated input signals in the range −30.0 to −10.0 dBmv, or to attentutated input signals which result in the same range of potentials at point B. The display circuit is designed, however, to operate on potentials at point B which cover the range −32.0 to −8.0 dBmv. Any signal outside of this range causes the digital read-out to be blanked. With respect to the 2 dB outside either end of the accurate range, a display is still formed, but the results are not accurate. It will be recalled that either the UNDER-RANGE or OVER-RANGE light flashes when the signal at point B is outside of the accurate measurement range. The two comparator circuits for controlling the flashing of these lights operate respectively whenever the potential at point B corresponds to a signal below −30.0 dBmv or a signal above −10.0 dBmv. A similar pair of comparators is provided in FIG. 14 for blanking the digital read-out. However, the threshold levels for these two comparators correspond to −32.0 dBmv and −8.0 dBmv. Only if the signal level at point B falls outside the −32.0 to −8.0 dBmv range is the read-out blanked. Thus readings within the 2 db outside either end of the accurate measurement range are displayed, although a flashing light informs the operator that the measurement is inaccurate. The 24-db operative range of input signal level corresponds to a potential range at point B of +6.0 to +8.4 volts. The 20-db accurate range corresponds to a potential range of +6.2 to +8.2 volts.

The operating principle of the measuring circuit of FIGS. 14 and 15 is as follows. At the start of each measurement cycle, a capacitor is charged so that a predetermined voltage (9.90 volts) appears at one of its terminals. Each clock pulse causes a drop in the capacitor potential of 0.01 volts. Since the greater the input signal level, the lower the potential at point B in FIG. 6, the greater is the number of pulses required to reduce the capacitor potential to the potential at point B. When the capacitor potential is reduced to the level of point B, further clock pulses are inhibited. The number of clock pulses generated from the start of the measurement cycle until the clock is inhibited is a function of the signal level. The clock pulses are counted in a three-stage counter, each stage of which controls the display of a respective digit. (As will be described below, the first clock pulse is not actually counted. The "error" is corrected during calibration of the instrument, as will also be described below. For explanatory purposes, it is convenient to ignore the uncounted first pulse.)

Simply counting clock pulses is not enough, however, because the number of clock pulses which are counted does not take into account the attenuation of the input signal by attenuator 36. The greater the attenuation introduced into the circuit, the greater the amount by which the final count should be increased (to indicate that the input signal level is really greater than the level represented at point B). This is accomplished by pre-setting the three-stage counter with a different count at the start of each measurement cycle depending upon which ones of the four attenuator pads are inserted in the circuit.

With no pads inserted, the counters are initially pre-set to −47.0. (Because the decimal point after the second digit is always illuminated, the setting of three stages with respective digits of 4, 7 and 0 results in a display of −47.0; the minus sign is also illuminated to the exclusion of the plus sign.) The capacitor voltage in the measuring circuit is always at 9.90 volts at the start of each measurement cycle. It will be recalled that the potential at point B is 8.2 volts for an input signal which corresponds to −30.0 db. Since each clock pulse causes the capacitor voltage to decrease by 0.01 volt, 170 pulses are required to cause the capacitor voltage to drop from 9.90 volts to 8.20 volts. These 170 pulses applied to the "down-count" input of the counter cause its pre-set count of −47.0 to increase to −30.0. (The absolute magnitude of the count, not considering the sign, decreases from 47.0 to 30.0; but because the sign is negative, the count actually increases as it cycles from a large negative number to a smaller negative number.) Thus with no attenuator pads inserted in the circuit, the minimum accurately measureable input signal of −30.0 dBmv results in a final count of −30.0 which is then displayed. On the other hand, if the input signal is at the high end of the accurate measurement range, −10 dBmv, which corresponds to a level of 6.2 volts at point B, a total of 370 clock pulses is required to decrease the capacitor voltage from 9.90 volts to 6.20 volts. These 370 clock pulses increase the counter count from −47.0 to −10.0 resulting in a display of −10.0 dBmv. For any input signal between the −30.0 dBmv and −10.0 dBmv limits, a number of pulses between 170 and 370 is required to reduce the voltage of the capacitor to the potential at point B, and the corresponding count at the end of the measurement cycle is displayed.

If the potential at point B is at 6.0 volts, which is lower than the minimum level of 6.2 volts for which an accurate measurement may be obtained, then 390 pulses are required before the initial capacitor voltage of 9.90 volts drops to the potential at point B. This results in a digital read-out of −08.0 dBmv (47.0−39.0=−08.0). If the potential at point B is below 6.0 volts, the read-out is completely blanked; but as long as the potential at point B corresponds to an input signal level between −10.0 dBmv and −08.0 dBmv, a read-out is still obtained. Because the measurement is not accurate if the potential at point B is below 6.2 volts, the OVER-RANGE light flashes, comparator A2 on FIG. 7 operating whenever the potential at point B drops below 6.2 volts. Only if the potential at point B drops below 6.0 volts does a comparator on FIG. 14 to be described below operate to blank the digital read-out.

Similarly, if the potential at point B is 8.4 volts corresponding to an input signal level of −32.0 dBmv, then to reduce the capacitor voltage from 9.90 volts to 8.40 volts requires 150 clock pulses. The pre-set count of −47.0 is thus increased to −32.0 and a display of −32.0 dBmv is formed. The operator is informed, however, that the reading is not accurate by the UNDER-RANGE light which starts to flash when the potential at point B goes above 8.2 volts (corresponding to a signal level below −30.0 dBmv). Any input level between −30.0 and −32.0 dBmv results in a corresponding display, accompanied by the flashing of the UNDER-RANGE light. A second comparator on FIG. 14 to be described below causes the read-out to be blanked if the potential at point B rises above 8.4 volts (corresponding to an input signal level below −32.0 dBmv).

In the event the 10-db pad is introduced by the attenuator, it is necessary to compensate for this by adding 10.0 dB to the measurement. Assuming that the potential at point B is between 6.0 and 8.4 volts corresponding to an input signal level between −08.0 and −32.0 dBmv, somewhere between 150 and 390 pulses will be generated before the capacitor potential matches that at point B. The number of pulses required to charge the capacitor until its potential equals that at point B depends solely upon the potential at point B, and it is thus not possible in the illustrative embodiment of the invention to increase the count by 10 dB by somehow increasing the number of clock pulses required to obtain a match between the capacitor potential and the potential of point B. With the 10-db pad inserted, it is known that the input signal level is really 10 dB higher than the final count which results when the counters pre-set at −47.0. For this reason, when the 10-db pad is inserted in the circuit, the counters are pre-set to −37.0. This simply causes the maximum and minimum counts each to be increased by 10.0, resulting in a displayable range between −22.0 dBmv and +02.0 dBmv. As will be described below, the counters which initially contain a count of 37.0 are decremented until they represent a count of 00.0, after which the count increments in the upward direction. Also as will be described below, while the sign originally displayed is a minus sign, whenever the count is decremented 00.0, the minus sign is turned off and the plus sign is illuminated.

In a similar manner, if any one of the three 20-db pads is inserted in the circuit, 20.0 dB must be added to the count. This is accomplished simply by pre-setting the counters with −27.0. If any of the 20-db pads is used together with the 10-db pad, then the count is pre-set at −17.0, and if any two of the 20-db pads are used, the count is pre-set at −07.0. In each case, the operation of the circuit is as described above, the only difference being that a different pre-set count results in a higher final value for the read-out.

If any two of the 20-db pads are inserted into the circuit together with the 10-db pad, the total attenuation is 50 db. This requires pre-setting the counters with a number which is 50.0 greater than the pre-set count of −47.0 which is the value used when none of the pads is inserted. Thus instead of pre-setting the three stages of the counter to represent −47.0, they are pre-set to represent +03.0. In such a case, instead of the clock pulses first decrementing the count and incrementing it only if a count of 00.0 is reached (at which time the sign changes from − to +), the plus sign is initially displayed and starting with the first clock pulse the count is incremented. In a similar manner, if all three 20-db pads are used the count is pre-set at +13.0, and if all four pads are used it is pre-set at +23.0. In the latter case, the resulting display can range between +38.0 dBmv and +62.0 dBmv.

There are only six connections between the circuit of FIGS. 14 and 15 and that of FIGS. 6 and 7. The first is the connection to point B of FIG. 6 (shown at the left side of FIG. 14), it being the voltage at this point on which the measurement is based. The block labelled 65 in FIG. 15 (shown in detail in FIGS. 16 and 17) includes the 3-stage counter discussed above, as well as the mechanism for pre-setting the counter at the start of each measurement cycle. The count which is pre-set in the counter is a function of which attenuator pads are inserted in the circuit. At the upper left corner of FIG. 6, four conductors are shown as being extended to the decoder of FIG. 15. As will be described below, each conductor is associated with one of the four pads and the potential of the conductor is an indication whether the pad is inserted in the circuit. These four conductors are shown entering block 65 on FIG. 15. The only other connection of the circuit of FIGS. 14 and 15 to that of FIGS. 6 and 7 relates to the 10-volt D.C. supply 34. In the circuit of FIGS. 14 and 15, any line which terminates in a single arrow represents a connection to source 34. (It is also to be understood that the two circuits have a common ground connection.) Some of the lines on FIGS. 14 and 15 terminate in a double arrow. A double arrow represents a connection to the 6-volt battery included in the system.

On FIG. 14, the two NAND gates A9 and A10, together with resistors R43 and R106 and capacitor C26, comprise a standard 20-kHz clock oscillator. Through inverters A11 and A12, a different one of transistors Q12 and Q14 is held on during alternate half periods of the clock cycle. Resistors R57 and R63 are the base biasing resistors for the two transistors, and inverters A11 and A12 alternately turn on the two transistors through resistors R58 and R64. Whenever transistor Q12 is on, collector current flows through resistors R59 and R60 to turn on transistor Q13. Current flows from the 10-volt source through capacitor C28 and the collector-emitter circuit of the transistor. Transistor Q13 does not remain on, however, for the entire half-period of conduction of transistor Q12. As capacitor C28 charges, the current through transistor Q13 decreases until eventually no current flows. In effect, a short pulse is developed across the emitter resistor R61 of transistor Q13. Since the base of transistor Q15 is connected to the emitter of transistor Q13, transistor Q15 turns on for a short interval during every half-period when transistor Q12 conducts.

Capacitor C30 in the collector circuit of transistor Q15 is the capacitor whose voltage is compared with the potential at point B and whose voltage is decremented in steps of 0.01 volts. Initially, the end of capacitor C30 connected to the collector of transistor Q15 is at 9.90 volts as described above. Whenever transistor Q15 turns on, the current which flows through the transistor decreases the potential at its collector by 0.01 volt. The magnitude of the current is determined by the setting of potentiometer R65, the setting being described below. The reason that the clock pulses themselves do not turn on transistor Q15 directly is that in such a case the capacitor charge would be increased by too great a step for each clock pulse. Transistor Q15 is turned on for only a brief interval during each half-period that transistor Q12 conducts.

In the alternate half-periods, transistor Q14 turns on and capacitor C28 discharges through resistor R62 and the transistor. This places the capacitor in a condition such that it can control the conduction of transistor Q13 for a brief interval during the next half period. Capacitor C29 is a conventional speed-up capacitor for controlling rapid switching of transistor Q14.

As will be described below, after the potential at the collector of transistor Q15 equals the potential at point B, the clock is inhibited from further operation and the display is formed. At the same time the output of inverter A18 goes low. The low potential extended through resistor R68 to the base of transistor Q16 causes the transistor to turn on. Capacitor C30 discharges through resistor R66 and the transistor to the point where the collector of transistor Q15 rises in potential to 9.90 volts. This is the potential required for the start of the next measurement cycle. The capacitor can be discharged immediately upon the detection of a match between the voltage at the collector of transistor Q15 and the voltage at point B inasmuch as by this time the count representing the measurement value has already been determined. Resistor R67 is the base bias resistor for transistor Q16, and capacitor C31 simply speeds up the switching of the transistor.

The potential at the collector of transistor Q15 is coupled to the non-inverting input of comparator A13, and the potential at point B is coupled to the inverting input. (Capacitor C27 serves simply as a noise filter.) As long as the potential at point B is lower than the potential at the collector of transistor Q15, the output of comparator A13 is high. But as soon as the potential at the collector of transistor Q15 falls below the potential at point B, the output of amplifier A13 goes low. The comparator is a precision voltage amplifier having a resolution of at least 0.01 volts (e.g., chip No. LH0042CD).

The two NAND gates A14 and A17, together with capacitor C32, diode D12 and resistors R70 and R71 comprise a standard one-shot multivibrator. With the output of comparator A13 being high, the output of gate A14 is low. Since this output is connected to the input of inverter A18, the output of the inverter is high to hold transistor Q16 off as required during the counting process. Similarly, the low potential at the output of gate A14 is extended to the input of inverter A8. The high potential at the output of this inverter, connected to one input of gate A9, allows the clock to function. But as soon as the output of comparator A13 goes low, the one-shot multivibrator is triggered and the output of gate A14 goes high. The high potential at the input of inverter A18 causes capacitor C30 to discharge in preparation for another measuring cycle as described above. Similarly, the high potential which is now at the input of inverter A8 causes one input of gate A9 to be held low to inhibit the clock from further operation. It is only after the one-shot multivibrator times out, after about 0.3 seconds, that another measurement cycle can begin with the operation of the clock.

Two other functions are controlled by the one-shot multivibrator. At the end of the measurement process, when the multivibrator is triggered, the output of gate A17 goes low. This output is connected to the latch enable (LE) input of each of the BCD-to-7-segment latch decoders A20, A21 and A22 (chip Nos. CD4511AE). Each of these elements has its four inputs connected to the four outputs of a respective one of the three counter stages, and has its seven outputs connected to the inputs of a respective one of display elements A23, A24 and A25. When a latch enable input is low, the count in the respective counter stage is transferred to the respective one of elements A20–A22. Thus elements A20–A22 are loaded with the final count at the start of the 0.3-second multivibrator pulse. During the 0.3-second multivibrator pulse, the count does not change; thus the final count remains in elements A20–A22 and is displayed in its final form. At the end of the 0.3-second pulse, the LE inputs go high in which case the stored digits remain latched and may not be changed. Even though a new measurement begins and the count changes, the previous final count is displayed until the end of the measurement.

The last function performed by the one-shot multivibrator is to control the pre-setting of a count in the counter. During the 0.3-second multivibrator pulse, the input of gate A16 is at ground potential and its output is high, having no effect on the counter stages. At the end of the 0.3-second pulse, the output of gate A14 goes low. The output of gate A15 goes high, the step is transmitted through capacitor C35 and resistor R73 to gate A16, and the gate output goes low to control the pre-setting of a count. Capacitor C35 charges rapidly so that the input of gate A16 is returned to ground. The output of gate A16 goes high so that following a short pre-setting interval, counting can commence. At the end of the counting cycle, the output of gate A14 goes high, and the output of gate A15 goes low. A negative step is transmitted through capacitor C35 and resistor R73 to gate A16. Since the gate output is already high, however, there is no change. The capacitor then charges so that at the end of the 0.3-second multivibrator pulse, conductor 68 can once again be pulsed low to control the pre-setting.

With respect to the three displays themselves (chip Nos. FND 560), the digit displayed by each is controlled by the digit latched in the respective one of latch decoders A20–A22. Each of the seven outputs of a latch decoder controls the illumination of a respective segment in the associated 7-segment display as is known in the art. Display element A24 has resistor R86 connected between its decimal point input and the 6-volt source. Thus a decimal point is always illuminated following the second digit of the display.

The three common-cathode connections of the three display elements are coupled together and returned to ground through resistor R91. This resistor is in parallel with transistor Q18. When the transistor is held off, the current which flows is sufficient to provide illumination in the presence of low ambient light. But in the presence of high-ambient light, a more intense display is desired, and photo-transistor Q19 (under window 61 in FIG. 13) is provided for this purpose. In the presence of high ambient light, the photo-transistor conducts more heavily. The collector of this transistor is coupled through resistor R89 to the base of transistor Q17, and the greater the conduction in transistor Q19 the greater the conduction in transistor Q17. Since the collector of transistor Q17 is connected to the base of transistor Q18, it is apparent that the greater the ambient light level, the greater the conduction in transistor Q18. Thus as the ambient light level increases, more and more current is diverted from resistor R91 through transistor Q18, and a greater current flows in each of the display segments which is turned on giving rise to a more intense display. Resistor 90 in the brightness-control circuit is simply the base bias resistor for the photo-transistor Q19 and resistor R88 is the emitter current limiting resistor for transistor Q17.

As will be described below with reference to the elements included in block 65, a potential is applied on conductor 70 to control the energization of either diode D15A (under the plus window 53 on FIG. 13) or diode D15B (under the minus window 54 on FIG. 13). The potential on conductor 70 is low whenever a minus sign is to be displayed and it is high whenever a plus sign is to be displayed. Light-emitting diode D15A is the PLUS LIGHT which is placed underneath window 53 in FIG. 13, and light-emitting diode D15B is the MINUS LIGHT which is placed under window 54 in FIG. 13. The inverting input of comparator A27 is held at a reference level determined by resistors R100 and R101. As long as conductor 70 is low, the non-inverting input of comparator A27 is held at the six-volt battery level through resistor R99, which level is lower than that at the inverting input. The output of comparator A27 is low and this causes transistor Q21 to conduct. The current which flows through the transistor, resistor R105 and diode D15B causes the diode to be energized to indicate that the measurement is a negative value. But if a plus sign is required, a positive potential is applied to conductor 70 and this potential is extended through diodes D14 and D16 to the non-inverting input of comparator A27. The potential at the non-inverting input is now greater than that at the inverting input, and the output of comparator A27 goes high. In such a case, transistor Q21 does not conduct and the MINUS LIGHT is not illuminated. Resistor R103 is the base current limiting resistor for transistor Q21, resistor R104 is the base bias resistor for the transistor, resistor R102 is a feedback resistor for comparator A27 which improves its transient response, and resistor R105 limits the current which flows through diode D15B.

Comparator A26 and the associated elements operate in a similar but converse manner. The non-inverting input of comparator A26 is coupled through resistor R95 to the six-volt battery source. But the inverting input is coupled through resistors R94 and R93 to ground. When a minus sign is to be displayed and a low potential appears on conductor 70, diode D14 does not conduct, the non-inverting input of the comparator is at a higher potential than the inverting input, and the output is high. Transistor Q20 is thus held off and diode D15A is not energized. But when a plus sign is to be shown, conductor 70 is high and this potential is extended through diode D14 and resistor R94 to the inverting input of comparator A26. The inverting input is now at a higher potential than the non-inverting input, and the output of the comparator goes low to turn on transistor Q20. At this time the current which flows through diode D15A causes the PLUS LIGHT to be lighted. Resistors R96, R97 and R98 are comparable in function to respective resistors R103, R104 and R105.

Capacitor C36 and resistor R92 improve the transient response of comparator A26 when the minus sign display must be changed to a plus sign display. It will be recalled that when the counters are pre-set with a negative count at the start of a measurement cycle, the minus sign is initially turned on, but that the sign is switched if the counter counts all the way down to 00.0. At such a time, conductor 70 goes from a low potential to a high potential, and it is desirable that the two comparators A26 and A27 switch as rapidly as possible. Capacitor C26 and resistor R92 improve the switching response of comparator A26. Similarly, resistor R102 speeds up the switching in the output of comparator A27.

In the event of an out-of-range condition, the digital display is blanked. In such a case, conductor 69 goes high in potential as will be described below. Inverter A19 thus generates a low potential which is extended through all three diodes D13, D17 and D18. The low potential extended through diode D13 to the BI (blank input) terminals of the three latches A20–A22 causes all three latches to de-energize their conductors extended to the respective displays. Thus the digit displays are blanked. Similarly, the low potential extended through diodes D17 and D18 to the inverting inputs of comparators A26 and A27 causes both comparator outputs to go high, thus holding off transistors Q20 and Q21 and resulting in the turning on of neither the PLUS LIGHT nor the MINUS LIGHT.

The actual circuit for generating a positive potential on conductor 69 in the event of an out-of-range condition is shown in the lower left of FIG. 14. The inverting input of comparator A7 is coupled through resistor R45 to the tap of potentiometer R44, and the non-inverting input of comparator A6 is coupled through resistor R50 to the tap of potentiometer R48. The potential at point B is coupled through resistors R46 and R49 to the non-inverting input of comparator A7 and the inverting input of comparator A6. As long as the potential at point B is within the measurement range (6.0 to 8.4 volts), the positive potential at the non-inverting input of comparator A7 is greater than the reference potential at the inverting input and the output of the comparator is high, and the potential at the inverting input of comparator A6 is less than the reference potential at the non-inverting input so that the output of comparator A6 is similarly high. Both of transistors Q10 and Q11 are held off and neither of diodes D10 and D11 conducts. Conductor 69 which is returned to ground through resistor R56 is thus held at a low potential to prevent blanking of the display.

But if the potential at point B decreases below the 6.0-volt reference level at the inverting input of comparator A7, the output of comparator A7 goes low. Transistor Q10 conducts and current flows through diode D10 and resistor R56 to ground. The positive potential on conductor 69 causes the display to be blanked. Similarly, if the potential at point B goes above the 8.4-volt reference potential at the non-inverting input of comparator A6, the comparator output goes low to turn on transistor Q11. Current now flows through this transistor, diode D11 and resistor 56 to ground, once again causing conductor 69 to go high in order to blank the display. In the two comparator circuits, resistors R52 and R54 are the base current limiting resistors for transistors Q10 and Q11, resistors R53 and R55 are base bias resistors, and resistors R47 and R51 are feedback resistors for improving the transient response of the respective comparators.

With this description of the circuit of FIGS. 14 and 15 in mind, reference may now be made to FIGS. 16 and 17 which depict in detail the elements included in the block labeled 65 in FIG. 15—the decoder, counters and count-reversing flip-flop.

The four conductors at the output of attenuator 36 are labeled in FIG. 16 as 75-10, 75-20(1), 75-20(2), and 75-20(3). Each of these conductors is shown connected in series with a switch 76. The switches are symbolic and indicate that whenever an attenuator pad is inserted in the circuit, the respective switch is closed to ground the respective conductor. Conductor 75-10 is grounded whenever the 10-db pad is inserted in the circuit. Conductor 75-20(1) is grounded whenever the first 20-db pad is inserted in the circuit, and the two other conductors are grounded when their respective 20-db pads are inserted in the circuit. Each of the conductors is connected through a respective one of resistors R107–R110 to the 10-volt supply, as well as to one of the four inputs (pins 20–23) A–D of decoder A29. The decoder functions to energize one of its sixteen outputs in accordance with the binary code represented at its A–D inputs. The 16 output pins of the decoder are numbered 1–17 with pin 12 omitted (in accordance with the numbering of chip No. MM74C154 which is the decoder chip used in the illustrative embodiment of the invention). The gate enable inputs G1 and G2 (pins 18 and 19) of the decoder are grounded as shown in FIG. 16 so that the decoder always functions. Depending on the binary code presented at the input of the decoder, 15 of the output pins are high and only one is low. For an input code of 0000 (where input A is the least significant bit), output pin 17 is low. For an input of 1111, output pin 1 is low. The binary codes 0000 and 1111 are indicated adjacent the respective output pins on FIG. 16. Each of the intermediate pins goes low when the respective binary code is presented at the input of the decoder in numerical order between pins 17 and 1.

The decoder outputs are coupled through several gates and diodes to the A–D inputs of the three counter stages A38–A40. Each of these stages is an MM74C192 chip which can be pre-set with a count, when a negative step appears at the respective load (LD) input, in accordance with the potentials appearing at the A–D inputs. The pre-set count is the binary value of the code appearing at the A–D inputs, where the potential at the A input is the least significant bit, a low potential represents a 0, and a high potential represents a 1.

Consider the case in which no pads are inserted in the circuit. For a decoder input code of 0000, all of the output pins are high, except pin 17 which is low. The output of inverter A36 is thus high and since this inverter output is coupled directly to the C input of stage A38, the C input is a 1. The D input is always a 0 since it is connected directly to ground. With all of the output pins of the decoder other than pin 17 being high, all of diodes D26–D29 are reverse biased. Since the A and B inputs of stage A38 are connected through respective resistors R112 and R113 to ground, the A and B inputs are also 0's. Consequently, the input code to stage A38 is 0100 (where the least significant bit at input A is the rightmost 0)—a decimal 4—and this is the digit which is pre-set in stage A38. It will be recalled that since the number 47.0 is loaded into the counter when no pads are inserted in the circuit, stage A38 requires the pre-setting of a 4.

With only pin 17 low, diodes D23, D24 and D25 are reverse biased. Ground potential is extended through resistor R111 to the input of inverter A37, and consequently the output of this inverter, connected to input C of stage A39, is high. Input D is grounded and inputs A and B are tied together to a positive potential. Consequently, the input code to stage A39 is 0111—a decimal 7—the proper digit for the pre-setting of stage A39 when no pads are inserted in the circuit.

Finally, since all of the A–D inputs of stage A40 are tied to ground potential, a 0 is loaded into this stage. A 0 is always loaded into this stage during the pre-setting step prior to the actual measurement.

It will be recalled that there are eight different numbers (neglecting the sign) which can be pre-set in the counter—47.0, 37.0, 27.0, 17.0, 07.0, 03.0, 13.0 and 23.0. It is apparent that while stage A38 may have to be loaded with any one of the digits 0–4, stage A39 is always loaded with either a 7 or a 3. It is for this reason that inputs A, B and D of stage A39 are always tied to positive or ground potentials. It is the value of the bit at input C which determines whether the overall input is 0111 (a 7) or 0011 (a 3). In the absence of the conduction of one of diodes D23–D25, the output of inverter A37 is high and a 7 is loaded into stage A39. The only time that a 3 is loaded into the stage is when one of the three diodes conducts and causes the output of inverter A37 to go low. There are only three cases which call for the pre-loading of a 3 in stage A39, and a different one of the three diodes conducts in each case.

When all four pads are inserted into the circuit, the counter must be loaded with the number 23.0. At this time, output pin 1 of decoder A29 is low, the output of inverter A30 is high, and diode D25 conducts to control the setting of a 3 in stage A39. When all three 20-db pads are inserted in the circuit but the 10-db pad is not, the code at the input of decoder A29 is 1110 (recalling that input A represents the least significant bit of the input code). In such a case pin 2 at the output of decoder A29 goes low, and the output of inverter A31 goes high to control conduction in diode D24. Thus once again a 3 is set in stage A39. The third case in which a 3 must be loaded in stage A39 is when the overall count to be loaded is 03.0—which count is required for a total attenuation of 50 db. This, in turn, requires the insertion of the 10-db pad and any two of the three 20-db pads. The three possible input codes to decoder A29 which represent an attenuation of 50 db are thus 1101, 1011 and 0111. The decimal equivalents of these numbers are 13, 11 and 7. Since the uppermost output pin of the decoder corresponds to a decimal input code of 15 and the succeeding output pins (up to pin 11) correspond to decimal codes in decreasing order, it is apparent that pins 3, 5 and 9 correspond to respective input codes of 13, 11 and 7. These three pins are tied to the inputs of gate A32. Whenever one of the three output pins goes low, the output of gate A32 goes high to control conduction in diode D23. This, in turn, controls the setting of a 3 in stage A39. For all other input codes, for which a 7 must be pre-set in stage A39, none of diodes D23–D25 conducts, input C of stage A39 is high, and a 7 is set in the middle stage of the counter.

With respect to the pre-setting of the digit in stage A38, it will be helpful to consider the following table during the analysis:

| DECODER INPUT | | | | ATTEN-UATION | DECODER OUTPUT PIN | PRE-SET DIGIT | COUNTER INPUT CODE | | | |
|---|---|---|---|---|---|---|---|---|---|---|
| D (20dB) | C (20dB) | B (20dB) | A (10dB) | | | | D | C | B | A |
| 0 | 0 | 0 | 0 | 0dB | 17 | 4 | 0 | 1 | 0 | 0 |
| 0 | 0 | 0 | 1 | 10dB | 16 | 3 | 0 | 0 | 1 | 1 |
| 0 | 0 | 1 | 0 | 20db | 15 | 2 | 0 | 0 | 1 | 0 |
| 0 | 0 | 1 | 1 | 30dB | 14 | 1 | 0 | 0 | 0 | 1 |
| 0 | 1 | 0 | 0 | 20dB | 13 | 2 | 0 | 0 | 1 | 0 |
| 0 | 1 | 0 | 1 | 30dB | 11 | 1 | 0 | 0 | 0 | 1 |
| 0 | 1 | 1 | 0 | 40dB | 10 | 0 | 0 | 0 | 0 | 0 |
| 0 | 1 | 1 | 1 | 50dB | 9 | 0 | 0 | 0 | 0 | 0 |
| 1 | 0 | 0 | 0 | 20dB | 8 | 2 | 0 | 0 | 1 | 0 |

| DECODER OUTPUT | | | | ATTEN-UATION | DECODER OUTPUT PIN | PRE-SET DIGIT | COUNTER INPUT CODE | | | |
|---|---|---|---|---|---|---|---|---|---|---|
| D (20dB) | C (20dB) | B (20dB) | A (10dB) | | | | D | C | B | A |
| 1 | 0 | 0 | 1 | 30dB | 7 | 1 | 0 | 0 | 0 | 1 |
| 1 | 0 | 1 | 0 | 40dB | 6 | 0 | 0 | 0 | 0 | 0 |
| 1 | 0 | 1 | 1 | 50dB | 5 | 0 | 0 | 0 | 0 | 0 |
| 1 | 1 | 0 | 0 | 40dB | 4 | 0 | 0 | 0 | 0 | 0 |
| 1 | 1 | 0 | 1 | 50dB | 3 | 0 | 0 | 0 | 0 | 0 |
| 1 | 1 | 1 | 0 | 60dB | 2 | 1 | 0 | 0 | 0 | 1 |
| 1 | 1 | 1 | 1 | 70dB | 1 | 2 | 0 | 0 | 1 | 0 |

The left column represents the decoder input; input A is a 1 only when the 10-db is inserted in the circuit, and each of the inputs B–D is a 1 only when the respective 20-db pad is inserted in the circuit. The second column represents the total attenuation for each input combination. The third column simply lists the output pin of the decoder which goes low for each input combination. The fourth column lists the decimal digit which must be pre-set in stage A38 for each value of attenuation as described above. Finally, the last column represents the input code required at pins A–D of stage A38 in order to pre-set the respective decimal digit, the input code simply being the binary equivalent of the decimal digit.

It will be noted that in all cases, input D of the input code must be a 0. It is for this reason that input D of stage A38 is tied to ground. As for input C, it must be a 1 in only one case—when decoder output pin 17 goes low. It will be noted that input C of stage A38 is coupled to the output of inverter A36 whose input is connected to pin 17. Consequently, the only time that input C of stage A38 is high is when the input to the decoder is 0000.

Input B is connected to the cathodes of diodes D28 and D29, and to resistor R113. If neither diode conducts input B is at ground potential. Thus it must be shown that one of diodes D28 or D29 conducts whenever a 1 is required at input B. Referring to the table, one of diodes D28 and D29 must conduct when any one of the decoder output pins 16, 15, 13, 8 or 1 goes low. When pin 16 is low, the output of inverter A35 is high to cause diode D29 to conduct. When pin 15, 13 or 8 goes low, the output of gate A34 goes high to control conduction in diode D21, and through this diode conduction in diode D28. Lastly, when output pin 1 goes low, the output of inverter A31 goes high, diode D22 conducts, and so does diode D28.

With respect to the A input of stage A38, it is also normally grounded through resistor R112. A 1 appears at the input only if one of diodes D26 and D27 conducts. From the table it is apparent that one of these two diodes must turn on when any one of decoder output pins 16, 14, 11, 7 or 2 goes low. When pin 16 goes low, the output of inverter A35 goes high to control the turning on of diode D27. When pin 14, 11, or 7 goes low, the output of gate A33 goes high to control conduction in diode D20, and therefore in diode D26 as well. Lastly, when pin 2 goes low, the output of gate A31 goes high to control conduction in diode D19, and therefore in diode D26 as well.

The load (LD) input of each of the counter stages is normally high, each of these inputs being coupled through resistor R115 to the 10-volt source. But whenever a new measurement is to be performed, the negative step on conductor 68 (at the output of inverter A16 on FIG. 14) is extended through diode D32 on FIG. 17 to the LD input of each counter stage. It is at this time that the counter is pre-set with a number which is dependent upon which attenuator pads are inserted in the circuit.

Control must also be exercised over whether the counters count upward or downward. When they are pre-set with negative numbers, e.g., −37.0, downward counting is required. Only when the total count reaches 00.0 is upward counting required. On the other hand, if the counters are pre-set with a positive number, e.g., +13.0, then upward counting is required from the very beginning of the measurement process. The flip-flop comprising gates A43 and A44 controls the direction in which the counters count, as well as the sign which is displayed.

When conductor 68 first goes low to control the pre-setting, the output of gate A44 goes high. This, in turn, forces the output of gate A43 low. Initially, until the count is decremented down to 00.0, a minus sign should be displayed. Since initially the output of gate A43 is low, the low potential on conductor 70 controls the illumination of the MINUS LIGHT as described above. As soon as the flip-flop changes state to control upward counting, conductor 70 goes high to control illumination of the PLUS LIGHT.

In order to understand the operation of the counter, it is first necessary to consider the polarity of the pulses which must be counted. Referring to the system clock A9/A10 on FIG. 14, it is when the output of gate A9 goes low that transistors Q12, Q13 and Q15 conduct in order to decrement the voltage at the junction of capacitor C30 and transistor Q15. At the end of each measurement cycle, the output of gate A8 goes low to stop the clock; when the clock is stopped the output of gate A9 is high. Thus it is a high potential on conductor 66 that defines the clock-inhibit state, and each "operative" clock pulse which must be counted appears on conductor 66 as a negative step followed by a positive step.

The clock pulses are coupled to an input of each of gates A41 and A42 on FIG. 17. Depending on the state of flip-flop A43/A44, the output of one of gates A41 or A42 is held high; during downward counting the output of gate A41 is held high, and during upward counting the output of gate A42 is held high. A high potential which is held at the UP or DN input of any counter stage has no effect on the stage; it is only step transitions that affect the stage.

Each stage operates as follows. The count is incremented when a positive step appears at the UP input, and the count is decremented when a positive step appears at the DN input. The CRY and BOR outputs are both normally high. If the count is 9, then the CRY output goes low when the UP input goes low and it remains low until the UP input goes high. If the count is 0, then the BOR output goes low when the DN input goes low and it remains low until the DN input goes high.

Suppose that downward counting is taking place. Each clock pulse appears at the DN input of stage A40 as a positive step followed by a negative step. The positive step decrements the count. When the count is decremented from 1 to 0, then at the end of the clock pulse, when the DN input goes low, the BOR output goes low. The negative step at the DN input of stage A39 does not decrement the count. However, if the count of stage A39 is 0, then the low potential at the DN input is reflected at the BOR output. It is when the DN input of stage A40 goes high that the BOR output goes high, at which time the positive step at the DN input of stage A39 causes its count to be decremented.

Suppose that the count has been decremented down to 00.1 by the time the next clock pulse arrives. The positive step at the DN input of stage A40 decrements the count to 00.0 without affecting the BOR output which remains high. At the trailing edge of the pulse, when the DN input of stage A40 goes low, since the stage now contains a 0, the low potential at the DN input is reflected at the BOR output. Since both of stages A39 and A38 contain counts of 0, the low potential is extended to the BOR output of stage A38.

The negative step at the BOR output of stage A38 is transmitted through diode D31 to gate A43 and switches the flip-flop. The output of gate A43 now goes high. Since the clock pulse has terminated, conductor 66 is now high in potential. Since both inputs to gate A41 are high, its output goes low. The negative step at the UP input of stage A40 has no effect. However, at the leading edges of the next clock pulse and all succeeding clock pulses, the UP input goes high and the count is incremented.

When the flip-flop first changes state at the end of the clock pulse which decrements the count from 00.1 to 00.0, the output of gate A44 goes low. This causes the output of gate A42 to go high; during the succeeding upward counting, the DN input of stage A40 remains high and has no effect on the circuit. However, in the process of gate A42 being "disabled" in this manner, its output goes high and the positive step at the DN input of stage A40 causes its count to decrement from 00.0 to 00.9, and provision must be made for the counter to be returned to 00.0.

Capacitor C37 and resistor R119 serve the purpose. At the end of the clock pulse which decremented the count to 00.0, the DN input of stage A40 goes low. All three BOR outputs go low since the low potential at the DN input of stage A40 is propagated through all three stages inasmuch as each stage contains a 0. The negative step at the BOR output of stage A38 is transmitted through capacitor C37 to the clear (CL) input of each stage, but the negative step has no effect. The capacitor simply charges through resistor R119. The same negative step switches the flip-flop and causes the DN input of stage A40 to go high, giving an erroneous count of 00.9. But because stage A40 now no longer contains a 0, its BOR output goes high. Thus the BOR outputs of stages A39 and A38 also go high. The positive step at the BOR output of stage A38 is transmitted through capacitor C37 to the CL input of stage A40 to reset its count from 9 back to 0. (Although not necessary, the clear pulse may also be applied to the CL inputs of stages A39 and A38, as shown.)

When the input attenuation is 50, 60 or 70 dB, the counters are pre-set with the respective numbers 03.0, 13.0 and 23.0; in each case, upward counting is required starting with the first clock pulse and in each case the plus sign must be illuminated right at the start of the counting process. Whenever one of these three values is stored in the counter, a 3 is stored in stage A39. It will be recalled that this is controlled by the output of gate A37 going low. The output of the gate is extended through diode D30 to the same input of gate A43 which is pulsed low to switch from downward counting to upward counting. Thus inverter A37, when it causes a 3 to be pre-set in stage A39, also causes the flip-flop to be held in the state which controls upward counting and the display of a plus sign, and the initial negative step on conductor 68 has no effect on the state of the flip-flop. Thus from the start of the measurement process, upward counting takes place and a plus sign is displayed.

The four outputs QA–QD of each counter stage are coupled through four respective resistors of resistors R74–R85 to respective inputs of latches A20–A22 on FIG. 15. As described above, at the end of each counting sequence, the count is latched in elements A20–A22 to control the display on elements A23–A25 during the next counting cycle. Immediately after the last count is latched in elements A20–A22, the three counters are pre-set and another counting cycle commences.

It is important to understand how the overall instrument is calibrated. The preferred way is as follows. An external 10-db pad is inserted in the input path and a 1-mv CW signal is applied at the input, i.e., an equivalent −10 dBmv input signal is applied at input 25 (FIG. 6) with none of the pads of attenuator 36 being inserted in the circuit. Potentiometers R6 and R10 in FIG. 6, as well as the IF gain control (not shown), are adjusted to provide 6.2 volts at point B, it being recalled that 6.2 volts corresponds to −10.0 dBmv. The digital display may not be −10.0, but potentiometer R65 (FIG. 14) is adjusted until a −10.0 reading is obtained. By adjusting the potentiometer, the incremental changes in the voltage at the collector of transistor Q15 may be increased or decreased slightly from 0.01 volt. With no pad inserted by the attenuator, the counter stages are pre-loaded with −47.0. The incremental voltage step is adjusted by potentiometer R65 until it requires exactly 370 pulses (producing a final display of −10.0) for the potential at the collector of transistor Q15 to reach the 6.2 volts at point B.

Thereafter, a −30.0 dBmv signal is caused to be applied at input 25. Potentiometer R6 is adjusted until a −30.0 dBmv display is obtained. Changing the setting of potentiometer R6 changes the response of the detector D1 and D2 to the CW signal, producing an 8.2-volt potential at point B. Of course, by adjusting potentiometer R6, it is possible that the display will no longer read −10.0 for a −10.0 dBmv input. For this reason, the −10 dBmv signal is now applied at input 25 and potentiometer R10 and the IF gain control are adjusted to once again provide a display of −10.0. The input signal is then switched to −30.0 dBmv and if the display is now incorrect as a result of the re-adjustments of potentiometers R10 and the IF gain, potentiometer R6 is once again re-adjusted. It usually takes no more than two or three iterations of this type for the display to be calibrated for both −10.0 and −30.0 dBmv signals. A 1.0-mv picture signal is then applied at the input with the 10-dB pad switched in and, as described above, potentiometer R3 (FIG. 6) is adjusted to provide an accurate reading of 00.0. While no calibration is made for a low-level picture signal at the other extreme, as described above, the additional bias current provided by transistor Q1 and potentiometer R3 greatly eliminate the error even at the low end of the scale.

As described above, a short pre-setting pulse appears on conductor 68 (FIG. 14) at the start of the measurement process when the output of gate A14 goes low. But the first negative clock pulse appears on conductor 66 at the same time. Since the counter stages are edge triggered, the first clock pulse is not counted; the pre-setting overrides the first clock pulse. Thus the voltage across capacitor C30 (FIG. 14) is actually decremented a number of times one greater than the number of clock pulses which are counted. Assuming that the capacitor voltage is initially set at 9.90 volts as described above and that each voltage decrement is 0.01 volts, the counting begins with an initial capacitor voltage of 9.89 volts. However, the uncounted first pulse presents no problem. The calibration procedure provides correction for all errors and it makes no difference what the sources of the errors are. The incremental voltage steps are not even necessarily 0.01 volts, but depend upon the setting of potentiometer R65 (FIG. 14). The uncounted clock pulse "error" is corrected by the adjustments of potentiometers R6, R10 and R65, and the IF gain, during the calibration procedure.

FIG. 18 shows a modification to the circuit of FIG. 14. Referring to FIG. 14, it will be noted that the emitter of transistor Q16 is connected directly to the 10-volt source. FIG. 18 shows the emitter of this same transistor connected to the tap of potentiometer R117. The potentiometer is connected between resistor R118 and source 90. Source 90 is not 10 volts, but rather 10.2 volts. The entire system is now powered by this source, rather than the 10-volt source 34 shown in FIG. 7. Depending upon the setting of potentiometer R117, the emitter potential of transistor Q16 can be adjusted.

It will be recalled that in the circuit of FIG. 14, when transistor Q16 turns on, it discharges capacitor C30 so that the collector of transistor Q15 is returned to 9.9 volts. It is this potential that is decremented in stepwise fashion each time that transistor Q15 turns on. The purpose of the circuit of FIG. 18 is to allow the original potential at the collector of transistor Q15 to be adjusted to a value somewhere between 9.7 and 10.1 volts. This allows an offset to be introduced using a front-panel control (not shown) which varies the setting of potentiometer R117.

To understand the manner in which the offset control can find use, consider the use of the instrument of the invention to measure the attenuation of pads having a nominal attenuation of 10 dB. Suppose that each test consists of applying a test signal having a constant level to the input of the pad to be tested, the output of the pad being connected to the input of the instrument. Suppose that when a pad which is known to be perfect is tested, the display is 20.1 dBmv. This means that the signal source must be at a level of 30.1 dBmv. Suppose further that a pad to be tested is then inserted in place of the "perfect" pad and the display is 19.9 dBmv. The operator must subtract this value of 19.9 from the signal level of 30.1 to determine that the pad is not a perfect 10-db pad but rather a 10.2-dB pad.

The test procedure is much simpler—especially if many pads are being tested—if when testing the "perfect" pad and obtaining a display of 20.1 dBmv, the offset control is adjusted to provide a display of exactly 20.0 dBmv. In such a case, the testing of the same "imperfect" pad will result in a reading of 9.8 dBmv. It is easier to mentally subtract 9.8 from 20.0 than it is to subtract 19.9 from 30.1. Especially when many such subtractions must be performed in succession and where errors cannot be tolerated, the offset adjustment can be employed advantageously. For such a use of the instrument, it is convenient to choose any round number (without tenths) to be displayed when a "perfect" pad is used in an initial calibration step, following which all of the other pads may be tested rapidly and accurately.

The offset control also finds use when very accurate measurements must be made. It is possible that the response of the RF tuner will vary with time and this will necessarily affect the accuracy of all readings. If high accuracy is required, it is possible to apply signals of known values to the input at each picture and sound carrier frequency. The offset control may then be adjusted until the correct display is obtained for each frequency. Thereafter, whenever the instrument is being used to measure an unknown signal, the offset control should first be set to the same position which provided an accurate reading of the calibrated signal at the frequency of the unknown signal. In other words, the instrument may be calibrated by plotting the offset required for each carrier of interest to provide an accurate measurement, following which that offset should be used when an unknown signal at the same carrier frequency is tested.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. In a tuning system for selectively extracting from a composite television signal the modulated picture signal on its carrier or the modulated sound signal on its carrier, the improvement of a circuit for indicating which of the two types of signal is being extracted comprising means for demodulating the extracted modulated signal to derive a signal representative of the envelope thereof, amplifying means tuned to one of the sync frequencies of a television signal for amplifying the signal derived by said demodulating means, and means for detecting the presence of a signal at the output of said amplifying means which exceeds a predetermined threshold level for indicating the presence of an extracted picture signal.

2. The improvement in accordance with claim 1 wherein said one sync frequency is the horizontal sync frequency.

3. The improvement in accordance with claim 2 further including means for providing a visual indication of the type of signal being extracted responsive to the operation of said detecting means.

4. The improvement in accordance with claim 1 further including means for providing a visual indication of the type of signal being extracted responsive to the operation of said detecting means.

5. The improvement in accordance with claim 1 wherein said tuning system includes means for processing the extracted modulated picture and sound signals at two different levels, and means for selecting the level in accordance with the operation of said detecting means.

6. In a signal strength meter for measuring the strength of each of two different types of information signal modulated on respective carriers in a composite signal, the signal strength meter including means for tuning to either carrier to extract a selected one of the two information signals and means for measuring the strength of the extracted information signal, the improvement comprising means for demodulating the extracted information signal, means for amplifying the demodulated information signal, said amplifying means being tuned to a frequency normally present in one of said information signals and normally absent from the other, and means responsive to the output of said amplifying means exceeding a predetermined threshold level for indicating the presence of said one information signal and responsive to the output of said amplifying means being below said threshold level for indicating the presence of said other information signal.

7. The improvement in accordance with claim 6 wherein the signal strength meter includes the same read-out means as part of said measuring means for representing the strength of either extracted information signal, and further including means for changing the response of the signal strength meter dependent upon the operation of said indicating means.

8. The improvement in accordance with claim 7 wherein said measuring means includes diode detector means, and said changing means is operative to adjust a bias current flowing through said diode detector means dependent upon the operation of said indicating means.

9. The improvement in accordance with claim 6 wherein said measuring means includes diode detector means, and further including means for adjusting a bias current flowing through said diode detector means dependent upon the operation of said indicating means.

10. The improvement in accordance with claim 9 wherein said composite signal is a television signal, and said two information signals are picture and sound signals.

11. The improvement in accordance with claim 10 wherein said frequency is a television sync frequency.

12. The improvement in accordance with claim 11 wherein said television sync frequency is the horizontal sync frequency.

13. The improvement in accordance with claim 6 wherein said composite signal is a television signal, and said two information signals are picture and sound signals.

14. The improvement in accordance with claim 13 wherein said frequency is a television sync frequency.

15. The improvement in accordance with claim 6 wherein the signal strength meter includes a read-out means as part of said measuring means for representing the strength of the extracted information signal, and further including means for providing a visual indication when the level of the extracted information signal is outside the accurate measurement range of said measuring means.

16. The improvement in accordance with claim 15 further including means for inhibiting the operation of said read-out means when the level of the extracted information signal is a predetermined distance away from the accurate measurement range of said measuring means, whereby as the level of the extracted information signal gets further away from the accurate measurement range a read-out is obtained together with a visual indication that it is inaccurate followed by the inhibition of the read-out.

17. The improvement in accordance with claim 6 further including means for introducing an offset in the output of said measuring means.

18. A signal strength meter for selectively measuring the picture signal level and the sound signal level in a television signal and displaying the results thereof on the same indicating device comprising means for extracting from the television signal a selected one of the modulated picture or sound signals, diode peak detecting means for operating on the extracted modulated signal to derive a signal proportional to the strength thereof for application to said indicating device, and means for controlling the bias current flowing through said diode peak detecting means at either a first level or a second level in accordance with the selected one of said modulated picture or sound signal.

19. A signal strength meter in accordance with claim 18 further including automatic gain control means for operating on the extracted modulated signal prior to the opertion on it by said diode peak detecting means, and wherein said indicating device indicates signal strength as a logarithmic function.

20. A signal strength meter in accordance with claim 19 wherein said indicating device is a combined analog panel meter and digital read-out.

21. A signal strength meter in accordance with claim 19 further including first means for setting the indication of said indicating device responsive to a measurement being taken of a sound signal of known high strength and second means for setting the indication of said indicating device responsive to a measurement being taken of a sound signal of known low strength, and third means for adjusting at least one of the bias current first and second levels to set the indication of said indicating device responsive to a measurement being taken of a picture signal of known strength.

22. A signal strength meter in accordance with claim 21 wherein the bias current flowing through said diode peak detecting means is set to be at the higher of the two levels when the strength of a picture signal is being measured.

23. A signal strength meter in accordance with claim 18 further including first means for setting the indication of said indicating device responsive to a measurement being taken of a sound signal of known high strength and second means for setting the indication of said indicating device responsive to a measurement being taken of a sound signal of known low strength, and third means for adjusting at least one of the bias current first and second levels to set the indication of said indicating device responsive to a measurement being taken of a picture signal of known strength.

24. A signal strength meter in accordance with claim 23 wherein the bias current flowing through said diode peak detecting means is set to be at the higher of the two levels when the strength of a picture signal is being measured.

25. A signal strength meter in accordance with claim 18 wherein said controlling means is manually operated.

26. A signal strength meter in accordance with claim 18 wherein said controlling means is automatic and includes means for demodulating the selected one of said picture or sound signal, amplifying means tuned to one of the sync frequencies of a television signal for amplifying the demodulated signal, and means for setting said bias current at a first level responsive to the signal at the output of said amplifying means exceeding a predetermined threshold value and for setting said bias current at a second level responsive to the signal at the output of said amplifying means being below said threshold value.

27. A signal strength meter in accordance with claim 26 further including automatic gain control means for operating on the extracted modulated signal prior to the operation on it by said diode peak detecting means, and wherein said indicating device indicates signal strength as a logarithmic function.

28. A signal strength meter in accordance with claim 26 wherein said indicating device is a combined analog panel meter and digital read-out.

29. A signal strength meter in accordance with claim 26 further including first means for setting the indication of said indicating device responsive to a measurement being taken of a sound signal of known high strength and second means for setting the indication of said indicating device responsive to a measurement being taken of a sound signal of known low strength, and third means for adjusting at least one of the bias current first and second levels to set the indication of said indicating device responsive to a measurement being taken of a picture signal of known strength.

30. A signal strength meter in accordance with claim 26 wherein the bias current flowing through said diode peak detecting means is set to be at the higher of the two levels when the strength of a picture signal is being measured.

31. A signal strength meter in accordance with claim 26 further including means for providing a visual indication when the level of the extracted signal is outside the accurate measurement range of the signal strength meter.

32. A signal strength meter in accordance with claim 31 further including means for inhibiting the operation of said indicating device when the level of the extracted signal is a predetermined distance away from the accurate measurement range of the signal strength meter, whereby as the level of the extracted signal gets further away from the accurate measurement range an indication of signal strength is obtained together with a visual indication that it is inaccurate followed by the inhibition of a signal strength indication.

33. A signal strength meter in accordance with claim 26 further including means for introducing an offset in the indication of said indicating device.

34. A signal strength meter in accordance with claim 18 further including means for providing a visual indication when the level of the extracted signal is outside the accurate measurement range of the signal strength meter.

35. A signal strength meter in accordance with claim 34 further including means for inhibiting the operation of said indicating device when the level of the extracted signal is a predetermined distance away from the accurate measurement range of the signal strength meter, whereby as the level of the extracted signal gets further away from the accurate measurement range an indication of signal strength is obtained together with a visual indication that it is inaccurate followed by the inhibition of a signal strength indication.

36. A signal strength meter in accordance with claim 18 further including means for inhibiting the operation of said indicating device when the level of the extracted signal is a predetermined distance away from the accurate measurement range of the signal strength meter.

37. A signal strength meter for selectively measuring the picture signal level and the sound signal level in a television signal and displaying the results thereof on the same indicating device comprising means for extracting from the television signal a selected one of the modulated picture or sound signals, detecting means for operating on the extracted modulated signal to derive a signal proportional to the strength thereof, means for driving said indicating device by said derived signal, and means for controlling the response characteristic of said detecting means in accordance with the selected one of said modulated picture or sound signal.

38. A signal strength meter in accordance with claim 37 further including automatic gain control means for operating on the extracted modulated signal prior to the operation on it by said detecting means, and wherein said indicating device indicates signal strength as a logarithmic function.

39. A signal strength meter in accordance with claim 37 wherein said indicating device is a combined analog panel meter and digital read-out.

40. A signal strength meter in accordance with claim 37 further including first means for setting the indication of said indicating device responsive to a measurement being taken of a sound signal of known high strength and second means for setting the indication of said indicating device responsive to a measurement being taken of a sound signal of known low strength, and third means for setting the indication of said indicating device responsive to a measurement being taken of a picture signal of known strength.

41. A signal strength meter in accordance with claim 37 wherein said controlling means is automatic and includes means for demodulating the selected one of said picture or sound signal, amplifying means tuned to one of the sync frequencies of a television signal for amplifying the demodulated signal, and means for controlling a first response characteristic of said detecting means responsive to the signal at the output of said amplifying means exceeding a predetermined threshold value and for controlling a second response characteristic of said detecting means responsive to the signal at the output of said amplifying means being below said threshold value.

42. A signal strength meter in accordance with claim 41 further including automatic gain control means for operating on the extracted modulated signal prior to the operation on it by said detecting means, and wherein said indicating device indicates signal strength as a logarithmic function.

43. A signal strength meter in accordance with claim 42 further including first means for setting the indication of said indicating device responsive to a measurement being taken of a sound signal of known high strength and second means for setting the indication of said indicating device responsive to a measurement being taken of a sound signal of known low strength, and third means for setting the indication of said indicating device responsive to a measurement being taken of a picture signal of known strength.

44. A signal strength meter in accordance with claim 43 wherein said one sync frequency is the horizontal sync frequency.

45. A signal strength meter in accordance with claim 43 further including means for providing a visual indication when the level of the extracted signal is outside the accurate measurement range of the signal strength meter.

46. A signal strength meter in accordance with claim 45 further including means for inhibiting the operation of said indicating device when the level of the selected signal is a predetermined distance away from the accurate measurement range of the signal strength meter, whereby as the level of the selected signal gets further away from the accurate measurement range an indication of signal strength is obtained together with a visual indication that it is inaccurate followed by the inhibition of a signal strength indication.

47. A signal strength meter in accordance with claim 43 further including means for introducing an offset in the indication of said indicating device.

48. A signal strength meter in accordance with claim 37 further including means for providing a visual indication when the level of the extracted signal is outside the accurate measurement range of the signal strength meter.

49. A signal strength meter in accordance with claim 48 further including means for inhibiting the operation of said indicating device when the level of the selected signal is a predetermined distance away from the accurate measurement range of the signal strength meter, whereby as the level of the selected signal gets further away from the accurate measurement range an indication of signal strength is obtained together with a visual indication that it is inaccurate followed by the inhibition of a signal strength indication.

50. A signal strength meter in accordance with claim 37 further including means for introducing an offset in the indication of said indicating device.

51. A signal strength meter for selectively measuring the strength of each of two different types of information signal modulated on respective carriers in a composite signal and displaying the results thereof on the same indicating device comprising means for extracting from the composite signal a selected one of the two information signals, detecting means for operating on the extracted modulated signal to derive a signal proportional to the strength thereof, means for driving said indicating device by said derived signal, and means for controlling the response characteristic of the signal strength meter in accordance with the selected one of said two information signals.

52. A signal strength meter in accordance with claim 51 further including automatic gain control means for operating on the extracted modulated signal prior to the operation on it by said detecting means, and wherein said indicating device indicates signal strength as a logarithmic function.

53. A signal strength meter in accordance with claim 51 wherein said indicating device is a combined analog panel meter and digital read-out.

54. A signal strength meter in accordance with claim 51 further including first means for setting the indication of said indicating device responsive to a measurement being taken of a first of said information signals of known high strength and second means for setting the indication of said indicating device responsive to a measurement being taken of a first of said information signals of known low strength, and third means for setting the indication of said indicating device responsive to a measurement being taken of the second of said information signals to known strength.

55. A signal strength meter in accordance with claim 51 wherein said controlling means is automatic and includes means for demodulating the selected one of said first and second information signals, amplifying means tuned to a frequency normally present in said first information signal and normally absent from said second information signal for amplifying the demodulated signal, and means for controlling a first response characteristic of the signal strength meter responsive to the signal at the output of said amplifying means exceeding a predetermined threshold value and for controlling a second response characteristic of the signal strength meter responsive to the signal at the output of said amplifying means being below said threshold value.

56. A signal strength meter in accordance with claim 55 further including automatic gain control means for operating on the extracted modulated signal prior to the operation on it by said detecting means, and wherein said indicating device indicates signal strength as a logarithmic function.

57. A signal strength meter in accordance with claim 56 further including first means for setting the indication of said indicating device responsive to a measurement being taken of a first of said information signals of known high strength and second means for setting the indication of said indicating device responsive to a measurement being taken of a first of said information signals of known low strength, and third means for setting the indication of said indicating device responsive to a measurement being taken of the second of said information signals of known strength.

58. A signal strength meter in accordance with claim 57 further including means for providing a visual indication when the level of the extracted signal is outside the accurate measurement range of the signal strength meter.

59. A signal strength meter in accordance with claim 58 further including means for inhibiting the operation of said indicating device when the level of the selected signal is a predetermined distance away from the accurate measurement range of the signal strength meter, whereby as the level of the selected signal gets further away from the accurate measurement range an indication of signal strength is obtained together with a visual indication that it is inaccurate followed by the inhibition of a signal strength indication.

60. A signal strength meter in accordance with claim 57 further including means for introducing an offset in the indication of said indicating device.

61. A signal strength meter in accordance with claim 51 further including means for providing a visual indication when the level of the extracted signal is outside the accurate measurement range of the signal strength meter.

62. A signal strength meter in accordance with claim 61 further including means for inhibiting the operation of said indicating device when the level of the selected signal is a predetermined distance away from the accurate measurement range of the signal strength meter, whereby as the level of the selected signal gets further away from the accurate measurement range an indication of signal strength is obtained together with a visual indication that it is inaccurate followed by the inhibition of a signal strength indication.

63. A signal strength meter in accordance with claim 51 further including means for introducing an offset in the indication of said indicating device.

64. In a tuning system for selectively extracting from a composite television signal the modulated picture signal on its carrier or the modulated sound signal on its carrier, a method for indicating which of the two types of signal is being extracted comprising the steps of demodulating the extracted modulated signal to derive a signal representative of the envelope thereof, detecting one of the sync frequencies of a television signal in the signal derived in said demodulating step, and responsive to the detection of said one sync frequency indicating the presence of an extracted modulated picture signal.

65. A method in accordance with claim 64 wherein said one sync frequency is the horizontal sync frequency.

66. A method in accordance with claim 64 wherein said tuning system includes means for processing the extracted modulated picture and sound signals at two different levels, and further including the step of selecting the level in accordance with the detection of said one sync frequency.

67. In a signal strength meter for measuring the strength of each of two different types of information signal modulated on respective carriers in a composite signal, the signal strength meter including means for tuning to either carrier to extract a selected one of the two information signals and means for measuring the strength of the extracted information signal, a method for indicating which of the two types of information signal is being extracted comprising the steps of demodulating the extracted information signal, examining the demodulated information signal for the presence of a frequency normally present in one of said information signals and normally absent from the other, and responsive to the detection of said frequency indicating the presence of said one information signal and responsive to the absence of the detection of said frequency indicating the presence of said other information signal.

68. A method in accordance with claim 67 wherein the signal strength meter includes the same read-out means for representing the strength of either extracted information signal, and further including the step of changing the response of the signal strength meter dependent upon the detection of said frequency.

69. A method in accordance with claim 67 wherein said composite signal is a television signal, and said two information signals are picture and sound signals.

70. A method in accordance with claim 69 wherein said frequency is a television sync frequency.

71. A method in accordance with claim 70 wherein said television sync frequency is the horizontal sync frequency.

72. A method for using a signal strength meter for selectively measuring the picture signal level and the sound signal level in a television signal and displaying the results thereof on the same indicating device comprising the steps of extracting from the television signal a selected one of the modulated picture or sound signals, operating on the extracted modulated signal to derive a signal proportional to the strength thereof for driving said indicating device, and controlling the response characteristic of the signal strength meter in accordance with the selected one of said modulated picture or sound signal.

73. A method in accordance with claim 72 wherein said indicating device is a combined analog panel meter and digital read-out.

74. A method in accordance with claim 72 further including the steps of setting the indication of said indicating device responsive to a measurement being taken of a sound signal of known high strength and setting the indication of said indicating device responsive to a measurement being taken of a sound signal of known low strength, and setting the indication of said indicating device responsive to a measurement being taken of a picture signal of known strength.

75. A method in accordance with claim 74 wherein said controlling step is automatic and includes the sub-steps of demodulating the selected one of said picture or sound signal, detecting one of the sync frequencies of a television signal in the demodulated signal, and controlling a first response characteristic of the signal strength meter responsive to the level of said one sync frequency in the demodulated signal exceeding a predetermined threshold value and controlling a second response characteristic of the signal strength meter responsive to the level of said one sync frequency in the demodulated signal being below said threshold value.

76. A signal strength meter in accordance with claim 75 wherein said one sync frequency is the horizontal sync frequency.

77. A method in accordance with claim 72 wherein said controlling step is automatic and includes the sub-steps of demodulating the selected one of said picture or sound signal, detecting one of the sync frequencies of a television signal in the demodulated signal, and controlling a first response characteristic of the signal strength meter responsive to the level of said one sync frequency in the demodulated signal exceeding a predetermined threshold value and controlling a second response characteristic of the signal strength meter responsive to the level of said one sync frequency in the demodulated signal being below said threshold value.

78. A signal strength meter in accordance with claim 77 wherein said one sync frequency is the horizontal sync frequency.

79. A method for using a signal strength meter for selectively measuring the strength of each of two different types of information signal modulated on respective carriers in a composite signal and displaying the results thereof on the same indicating device comprising the steps of extracting from the composite signal a selected one of the two information signals, operating on the extracted modulated signal to derive a signal proportional to the strength thereof for driving said indicating device, and controlling the response characteristic of the signal strength meter in accordance with the selected one of said two information signals.

80. A method in accordance with claim 79 wherein said indicating device is a combined analog panel meter and digital read-out.

81. A method in accordance with claim 79 further including the steps of setting the indication of said indicating device responsive to a measurement being taken of a first of said information signals of known high strength and setting the indication of said indicating device responsive to a measurement being taken of a first of said information signals of known low strength, and setting the indication of said indicating device responsive to a measurement being taken of the second of said information signals of known strength.

82. A method in accordance with claim 81 wherein said controlling step is automatic and includes the substeps of demodulating the selected one of said first and second information signals, detecting in the demodulated signal a frequency normally present in said first information signal and normally absent from said second information signal, and controlling a first response characteristic of the signal strength meter responsive to the level of said frequency in the demodulated signal exceeding a predetermined threshold value and controlling a second response characteristic of the signal strength meter responsive to the level of said frequency in the demodulated signal being below said threshold value.

83. A method in accordance with claim 79 wherein said controlling step is automatic and includes the substeps of demodulating the selected one of said first and second information signals, detecting in the demodulated signal a frequency normally present in said first information signal and normally absent from said second information signal, and controlling a first response characteristic of the signal strength meter responsive to the level of said frequency in the demodulated signal exceeding a predetermined threshold value and controlling a second response characteristic of the signal strength meter responsive to the level of said frequency in the demodulated signal being below said threshold value.

* * * * *

UNITED STATES PATENT OFFICE
CERTIFICATE OF CORRECTION

Patent No. 4,189,750      Dated February 19, 1980

Inventor(s) Hans Sadel

It is certified that error appears in the above-identified patent and that said Letters Patent are hereby corrected as shown below:

Abstract, line 1, "lever" should read "level".

Column 13, line 13, "compartor" should read "comparator".

Column 25, first table, third line, under "Attenuation", "20db" should read "20dB".

Signed and Sealed this

Eighth Day of July 1980

[SEAL]

*Attest:*

SIDNEY A. DIAMOND

*Attesting Officer*      *Commissioner of Patents and Trademarks*